(12) United States Patent
Wang et al.

(10) Patent No.: US 11,023,921 B2
(45) Date of Patent: Jun. 1, 2021

(54) PROVIDING DATA AND ANALYSIS FOR ADVERTISING ON NETWORKED DEVICES

(71) Applicant: ADELPHIC LLC, Irvine, CA (US)

(72) Inventors: Changfeng Charles Wang, Lexington, MA (US); David Rydzewski, Sudbury, MA (US)

(73) Assignee: ADELPHIC LLC, Irvine, CA (US)

( * ) Notice: Subject to any disclaimer, the term of this patent is extended or adjusted under 35 U.S.C. 154(b) by 924 days.

(21) Appl. No.: 14/862,876

(22) Filed: Sep. 23, 2015

(65) Prior Publication Data

US 2016/0086215 A1      Mar. 24, 2016

Related U.S. Application Data

(60) Provisional application No. 62/054,243, filed on Sep. 23, 2014, provisional application No. 62/054,183, filed on Sep. 23, 2014.

(51) Int. Cl.
*G06Q 30/02* (2012.01)
*H04L 29/08* (2006.01)

(52) U.S. Cl.
CPC ..... *G06Q 30/0246* (2013.01); *G06Q 30/0275* (2013.01); *H04L 67/306* (2013.01)

(58) Field of Classification Search
CPC combination set(s) only.
See application file for complete search history.

(56) References Cited

U.S. PATENT DOCUMENTS

| | | | |
|---|---|---|---|
| 2005/0165766 A1 | 7/2005 | Szabo | |
| 2007/0061246 A1 | 3/2007 | Ramer et al. | |
| 2007/0271145 A1* | 11/2007 | Vest | G06Q 30/02 705/14.41 |
| 2008/0109285 A1 | 5/2008 | Reuther et al. | |
| 2011/0119126 A1* | 5/2011 | Park | G06Q 30/02 705/14.45 |
| 2011/0246297 A1* | 10/2011 | Buchalter | G06Q 30/02 705/14.53 |
| 2011/0258049 A1* | 10/2011 | Ramer | G06Q 30/02 705/14.66 |
| 2015/0134463 A1* | 5/2015 | Jalali | G06O 30/0275 705/14.71 |

OTHER PUBLICATIONS

International Search Report and Written Opinion, PCT/US15/51701, dated Jan. 6, 2016, 16 pages.

* cited by examiner

*Primary Examiner* — Mario C. Iosif

(74) *Attorney, Agent, or Firm* — Gates & Cooper LLP

(57) ABSTRACT

Methods, systems, and apparatus, including computer programs encoded on computer storage media, for providing data and analysis for advertising on networked devices. One of the methods includes creating a vector of identifiers representing an ad opportunity. The method includes linking data attributes that describe the ad opportunity to the identifiers. The method includes expressing the data attributes following predefined scheme of hierarchy. The method includes linking a taxonomy describing data attributes. The method includes obtaining outcome measurements of ad events associated with the ad opportunity. The method also includes associating user interaction events with the ad with at least one of the identifiers or data attributes associated with the identifier.

21 Claims, 11 Drawing Sheets

PROVIDING DATA AND ANALYSIS FOR ADVERTISING ON NETWORKED DEVICES

CLAIM OF PRIORITY

This application claims priority to U.S. Provisional Patent Application Ser. No. 62/054,183, filed on Sep. 23, 2014 and entitled "Analyzing Data for Advertising on Networked Devices," the entire contents of which is hereby incorporated by reference and U.S. Provisional Patent Application Ser. No. 62/054,243, filed on Sep. 23, 2014 and entitled "Providing Data and Analysis for Advertising on Networked Devices" which is hereby incorporated by reference.

BACKGROUND

Wide spread mass market adoption of new networked devices such as mobile phones, tablets, etc. has ushered in a new era of media consumption. The proliferation of these devices, as well as ubiquitous Internet access, is dramatically changing how users interact with each other, entertain, shop, and consume media. Mobile Internet usage is quickly surpassing wired Internet usage. This provides excellent opportunities for advertisers to reach and engage audiences on mobile in conjunction with other devices and media channels.

SUMMARY

In general, one innovative aspect of the subject matter described in this specification can be embodied in methods that include the actions creating a vector of identifiers representing an ad opportunity including linking data attributes that describe the ad opportunity to the identifiers, expressing the data attributes following predefined scheme of hierarchy, and linking a taxonomy describing data attributes. The method includes the actions of obtaining outcome measurements of ad events associated with the ad opportunity. The method also includes the actions of associating user interaction events with the ad with at least one of the identifiers or data attributes associated with the identifier.

Another innovative aspect of the subject matter described in this specification can be embodied in methods that include the actions of receiving data from plurality of supply sources, the data including at least one of historical data, static data, build data, and access data. The methods include the actions of building profiles of ad opportunities. The methods include the actions of receiving a request, the request including a plurality of attributes. The methods include the actions of encoding the request according to the model. The methods include the actions of processing the encoded request to retrieve profiles matching the plurality of attributes. The methods also include the actions of returning the profiles.

Another innovative aspect of the subject matter described in this specification can be embodied in methods that include the actions of creating profiles for a plurality of ad requests by aggregating inventory metrics using one or more identifiers according to a model. The methods include the actions of identifying a plurality of inventory vectors based on the profiles. The methods include the actions of creating a profile database of ad performance comprising performance metrics for each inventory vector, associated data attributes, and ad identifiers. The methods include the actions of providing predictions of ad performance metrics as function of time, index of inventory attributes, and the data attributes. The methods also include the actions of providing a user interface to enable a user to query one or more metrics associated with the one or more identifier.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination the vector may include a user identifier, a media identifier, location identifier, and may include an ad spot identifier. The media identifier may be associated with at least one of a publisher, an application, a website, video source, and a media segment. The user identifier may be associated with at least one of a set of device identifiers or media channel identifiers or signatures. The vector may further include data attributes identifying one or more spot positions, each spot position identifying at least one of a screen position and a frame position; The screen position may be at least one of a top location for display, a bottom location for display, sides for display. The frame position may be at least one of pre-roll, mid-roll, post-roll for video. The data attribute furthers contain an identifier, a name, source, usage preference, pricing information. The media identifier may include at least one of publishers, application or site, and segments of the media. The user identifier may be further be linked to a set of device and media specific identifiers. The methods may further comprise the actions of qualifying the request by applying a plurality of rules to the request. The methods may further comprise the actions of updating at least one profile according to the model. The supply sources may include at least one of networked end user devices and applications executing on such devices, such as a Web tag that may be executed in a browser, a code segment in a mobile app, tracking services, output of Web crawler, a mobile application catalog, an ad server, a media publisher content server, a video content catalog, an offline data file, or a third party data provider service. The profiles include user data associated with a plurality of user identifier keys, at least one user identifier key linked to at least one of unique user identifiers and segment identifiers; contextual data including media identifiers; device data profiles including at least one of a model identifier; location data profiles including at least one of a physical location description, a country, a state, a province, a city, a district, a street, a zip code, a building, a natural geographic characteristic, a lake, a river, a school, a business, a type of business, a demographic composition of the area; and a network data profile. The request may involve a grouping of data attributes and bid price. The grouping rule may be an index involving at least one of one or more of the data attributes and one or more metrics using the data attributes as input. The inventory metrics may include at least one of number of request, click through rate, conversions rate, prices, bid floors and the time horizon. The predictions may include at least one of bid prices as function of index of inventory; winning rate as a function of price and index of inventory, inventory identifiers, index of identifiers, time; click through rate, conversion rate, and life time value. The predictions may be associated with a measure of accuracy and a confidence level. One or more data attributes may be assigned a value and an incremental value.

Particular embodiments of the subject matter described in this specification can be implemented to realize one or more of the following advantages. Relevant data connected to media buying and selling goals may be systematically collected and analyzed to provide complete information and finer grained bucketing of ad opportunities. Finer buckets may further enable better matching of ad opportunities and advertising goals. In particular, more than one data point can be combined, and effect of ad hoc intuitions such as retargeting can be quantified and may use any relevant data point. Value and incremental value of additional data attributes and sources can be measured, and traded in addition to media, generating economic benefits to data owners.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
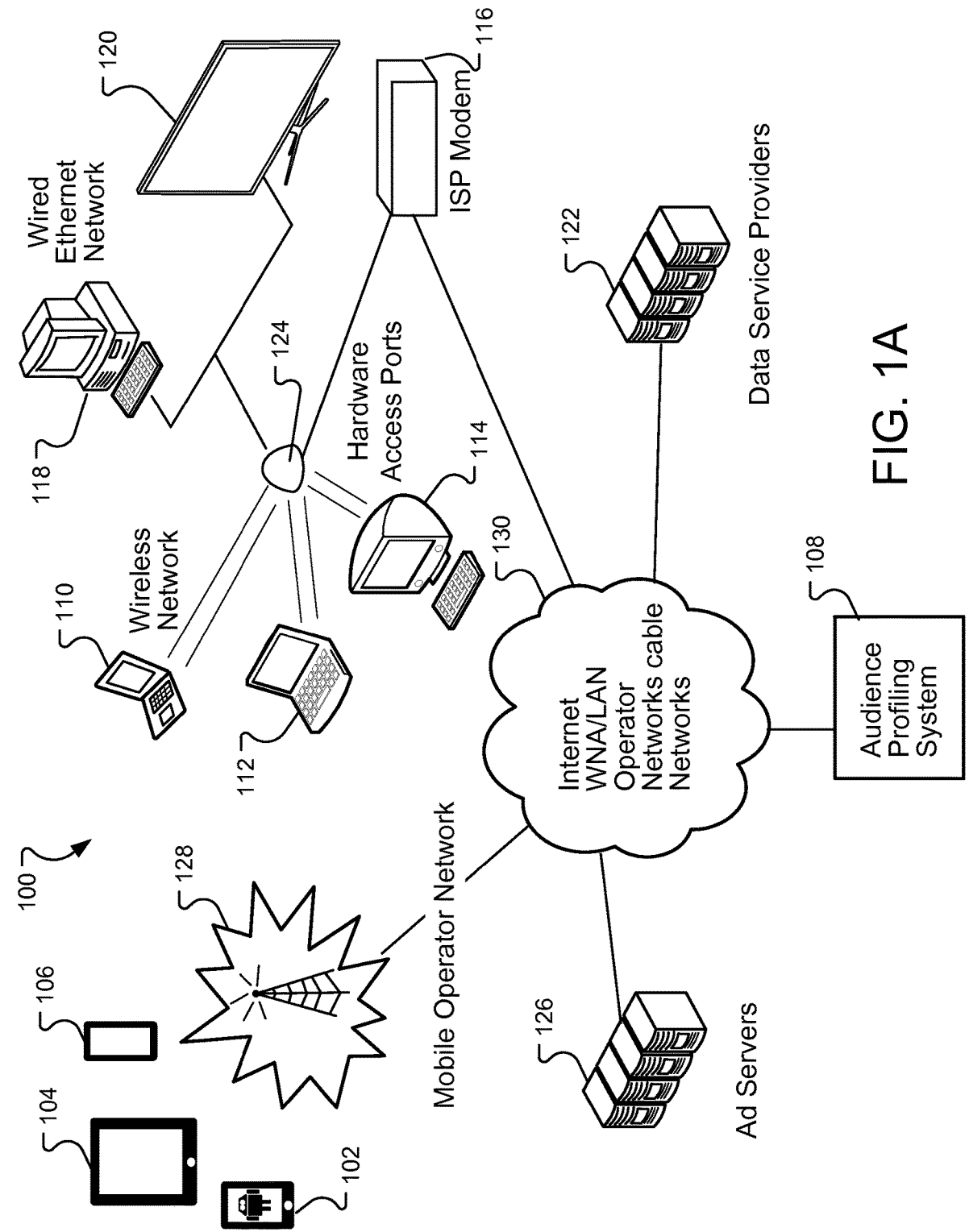
FIG. 1A depicts an environment for implementation for providing data and analysis of networked devices.

The present disclosure relates to data analytics and advertising on mobile and other devices connected to communication networks, and deals more particularly with methods, apparatus, and computer programs for organizing and ranking advertising opportunities on networked devices. The ranking can be used to provide effective advertising across devices and channels.

Users can consume media using a wide variety of different devices. Previously, users would consume media using only a limited number of channels. For example, audio would be consumed using the radio or a recording, while video would be consumed as a movie, television program, or video recording. Today, users can not only access media using new channels (such as streaming), but users can consume media using a wide variety of different devices. This increase in the methods of accessing media causes an increased fragmentation of the user base. Users may be divided and addressed according to types of devices, media channels, communication networks, locations, and other variables; and the data might be owned by different organizations in the world. Each of these user categories can be generally referred to as silos. Silos present increasing challenges in the buying and selling of ad media across multiple devices and media channels.

As such, there may be a considerable need for a mechanism to provide data and analysis to support decision making (e.g., media buying/planning, targeting/retargeting, bidding decisions, and inventory packaging) across devices and channels. Traditional advertisement management systems use only partial data in silos to address users. For example, search-advertising uses contextual association of ads to context; current practice of programmatic advertising relay on cookie identified data that work primarily only for Web media or limited user specific data. And ad buying uses a few select metrics to make decisions. Their metrics are generally chosen based on the intuition of a user of the system. These traditional systems suffer from the inability to address users across devices and channels and at required level of information for effective decision making, and biases of the decision makers, which leads to suboptimal decisions.

A system can systematically extract and leverage different types of information. Analysis of the information can enable the system to predict the performance of a particular outcome of campaign. The analysis of the information can also be used as a driver in the distribution of advertisements to users across multiple devices.

A system can systematically combine and analyze information about users in context of media, location and time to completely describe the state of advertising opportunities in relation to ad goals. The combined information and analysis can be collected as audience data overlaid on media context, location, and time. Metrics and models can be build in relation to the states and ad to form state dynamics, whence providing complete information for buying and selling ads and data. In some implications, the data may be further analyzed and extended. The audience data in and analysis can be used to enable data-driven advertising across networked devices and media channels. The audience data and analysis can be determined based on user data that is collected before and/or while a request for an advertisement or other piece of content is made. A system can provide comprehensive real-time ad opportunities, data profiling, and real-time information for decision making for cross-device and channel advertising, and/or advanced analytics. The analytics can include audience profiles overlaid with media touch points and network contexts. The analytics can also include metrics and predictions of the outcome of ad events (for example, the analytics can be used to predict the likelihood that a particular user will click on a particular advertisement when presented in a particular context).

Some conventional ad models may provide a universal representation of ad opportunities involving audience data. These ad models provide a common language for targeting, retargeting, and unifying analysis for all devices and channels. The ad models can be used to seamlessly integrate and exchange data from multiple different sources. An analysis framework can include a set of metrics. The analysis framework can also include mechanisms to compute and utilize the metrics. The analysis framework can provide a complete picture of ad opportunities as they relate to specific user attributes, channels, media contexts, physical locations, and time bands. The analysis framework may also include mechanisms to leverage the data to predict, measure, and rank the relevance of each targeting attribute. It may also include mechanisms to measure the value (and incremental value) of different data sources and attributes, including data provided by third parties. The analysis framework can also use channel attribution.

Audience data and analysis provided by the system may be utilized for decision-making. The audience data and analysis may be used with a supply side advertisement platform. The audience data and analysis may be used with a demand side advertisement platform decision engine. The audience data and analysis may also be used by independent data and analysis systems, exchanges, publisher portals, and enterprise marketing automation systems.

The Environment

FIG. 1A illustrates an example environment 100 including an audience profiling system 108. The audience profiling system 108 can provide real time data and analysis that supports data driven advertising. In this example, end user devices such as mobile phones 102,106, tablets 104, laptops 110, 112, desktop computers 114, 118, and other smart devices (such as the television 120) are connected to the audience profiling system through a network 130 (for example, the Internet, operator networks, wide area networks, LAN, etc.) Publisher content servers (not shown), ad servers 126, advertiser exchanges (not shown), and demand side servers (not shown) can also connected to the audience profiling system through the network 130.

The audience profiling system 108 can support different connection protocols. For example, user devices may communicate over the Internet using the Hyper Text Transport Protocol (HTTP). The user devices may connect to the Internet, for example, through operator networks 128 or an Internet service provider (ISP) 116. In addition, certain devices (for example a set top box) may communicate using the user datagram protocol (UDP). User devices may connect to the audience profiling system indirectly through publisher ad servers, advertiser exchanges, and publisher content servers for real-time connections communications.

User devices, publishers, and third party data providers may provide user data to the audience profiling system and consume audience data from the audience profiling system. A third party data provider may connect to the audience profiling system using real-time connections, including HTTP requests, batch file uploads, streaming, etc.

FIG. 1A also includes an ad server 126. In this example, the ad server 126 is a consumer of audience data. The ad server 126 may be a buy side server that uses audience data to help demand side platforms, advertising exchanges, or publisher ad servers. The ad server may help these platforms enrich their inventory value (that is the value of placing and selling advertisements).

A user may use one or more devices that are connected to networks for various activities. For example, the user may do research, communicate with friends or co-workers through on social network sites, check emails, stream or download video and/or audio content, and/or play games on a desktop computer. Determining a user's action can be further complicated because a desktop computer may be shared between multiple household members. Alternatively, the desktop computer may also be located at an office. The desktop computer in the office may be used by more than one coworker or may be transferred between coworkers based on need.

At the same time a user may use a wide variety of different types of user devices. The same user may open up applications on a computer, a smartphone or tablet device. Many user devices are portable (for example, smartphones, notebook computers, tablets, etc.) and these devices can connect to the Internet from a variety of different locations (such as coffee shops, Internet cafes, wireless hotspots, and through a mobile carrier).

Each action a user takes online, from researching a topic to watching a sitcom, provides data that can be used to enhance advertising. Additionally how, when, and where the user performs these actions can also be significant. This data provides helpful information for buyers and sellers of digital media.

Information about the user's actions can be combined with data provided from third parties. Marketers, advertisers and other data providers can provide additional user data that further describes the users. Such data, as well as data accumulated from other various digital sources, is part of the data provided by third party data providers.

Figure 2A:
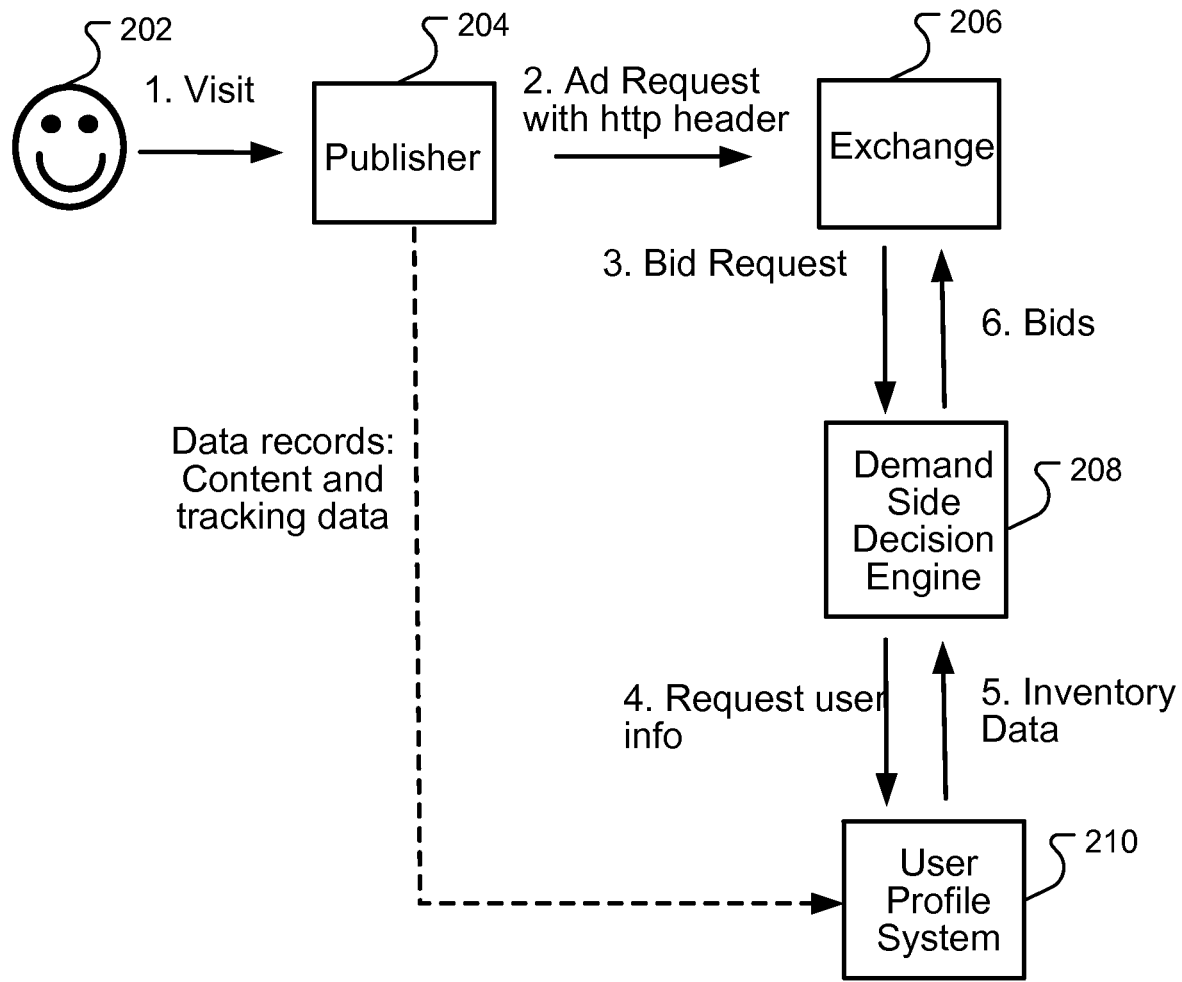
FIG. 2A depicts a demand side ad server or decision engine which uses the data service to help real-time buying decisions (e.g., to get media planning info including availability, pricing, performance against index; buying and selling, what index works, performance prediction, bidding, price).
Figure 2B:
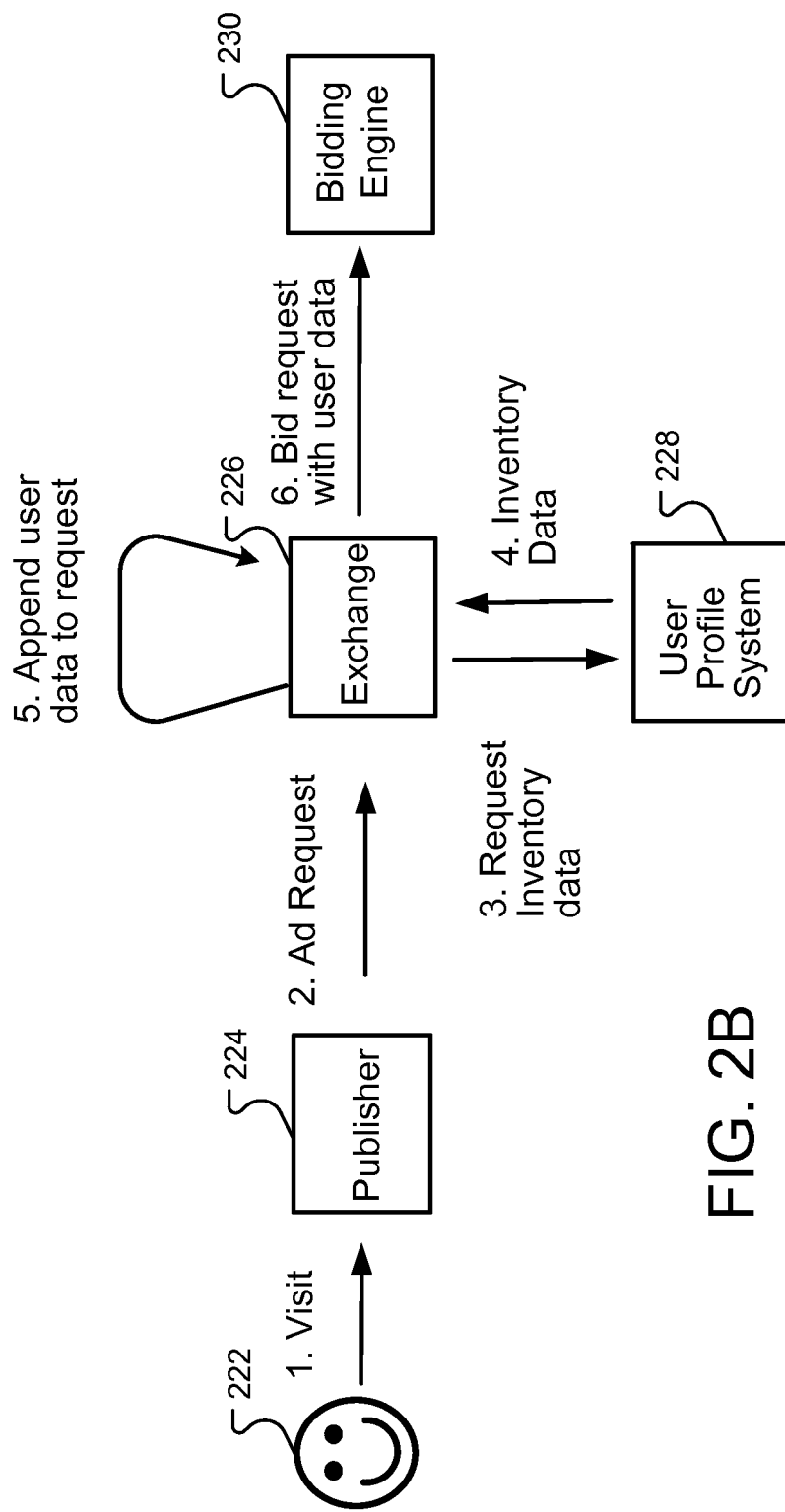
FIG. 2B depicts an ad exchange where data is used to enhance inventory values.
Figure 2C:
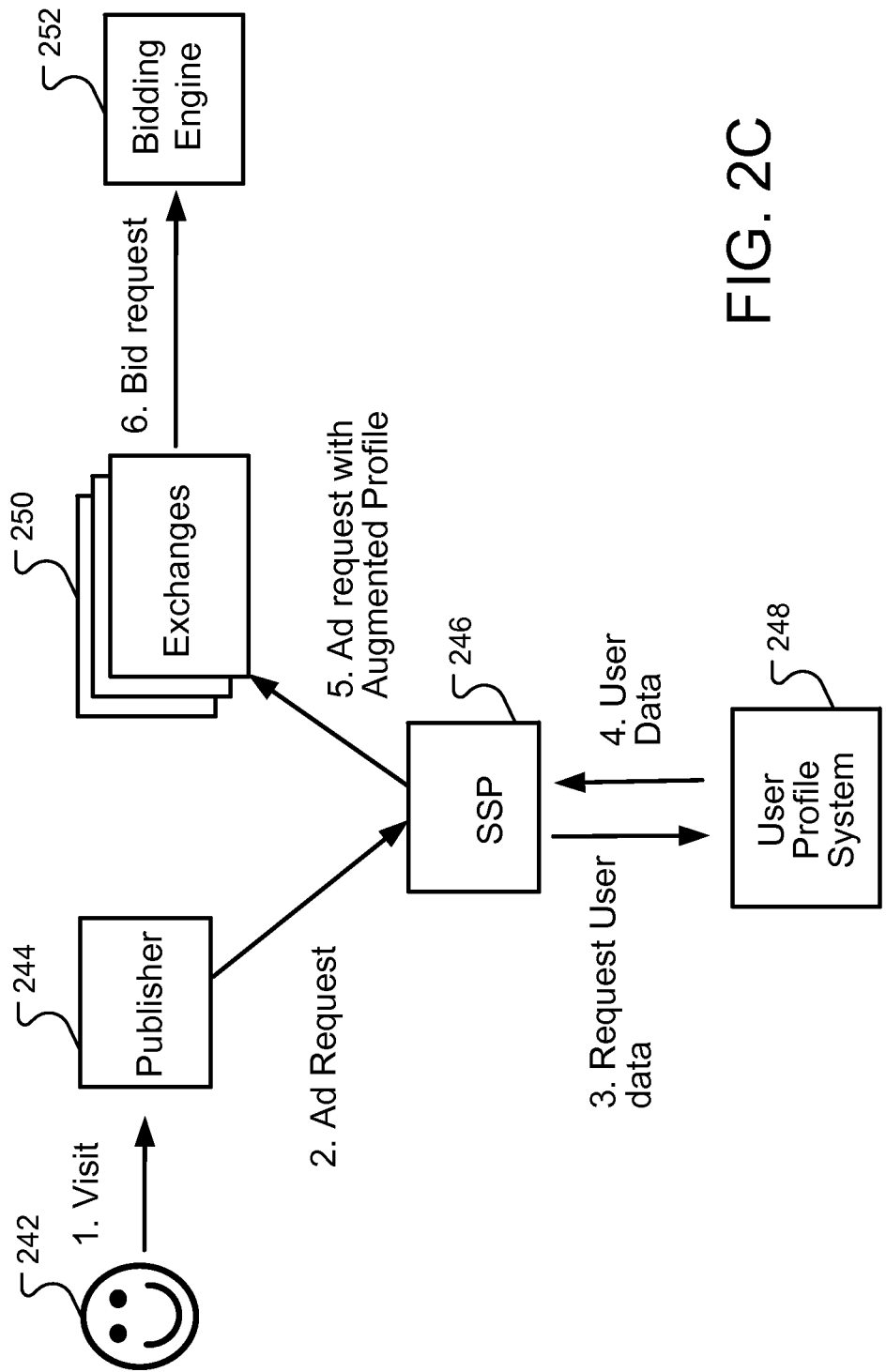
FIG. 2C is an example embodiment with a publisher or supply side engine, which uses data services to profile inventory to make it targetable, augment inventory with audience data, and help package or make sell optimization decisions.

FIGS. 2A-2C illustrate various examples of user data services. FIG. 2A illustrates in more detail how a demand side ad system the system. When a user consumes a media provided by a publisher, an ad request may be sent to an ad server at an exchange, which may send the request to demand side engine for bidding of the ad opportunity. The demand side engine may then send part of all of information to the data services system to one or more data attributes about the ad opportunity. And the system will parse then uses the request information to fetch relevant data, and send the data to the demand side engine, which then uses the data to help make a bidding decision. FIG. 2B illustrate a similar usage. As illustrated in FIG. 2B likewise an ad exchange may use the system as a value added service to publishers and buyers. The same ad request information as in FIG. 2A is used to extract data about the ad opportunity, and forwarded to one or more bidders. Likewise, as illustrated in FIG. 2C, an SSP may follow a similar process to retrieve the data to enrich publisher data in the form of audience extension, data enrichment.

Referring to FIG. 2A, FIG. 2A illustrates an example of a demand side data engine interacting with a User profile system. In FIG. 2A, the user data may be used to make buying decisions and channel optimization. In general, a demand-side platform (DSP) may allow buyers of digital advertising to manage multiple ad exchange and data exchange accounts through one interface. A user 202 visits a website or other content provided by a publisher 204. The publisher 204 initiates a real-time bidding for the display of online advertising to the user. Generally, the bidding takes place within the ad exchanges 206. The ad exchange 206 can provide the bid request to a demand side decision engine 208. The demand side decision engine 208 requests user information (for example, information about the user 202) from a User profile system 210. The User profile system 210 can maintain information about different users. The User profile system 210 provides information about the user to the demand side decision engine 208. The demand side decision engine 208 provides bids to the exchange 206. The exchange 206 may select an advertisement based on the bids and bid information.

FIG. 2B illustrates an example of a user platform for a supply side engine. In general, a supply-side engine can enable publishers 224 to manage their advertising impression inventory and potential maximize revenue from digital media. When a user 222 visits a website or content provided by a publisher 224, the publisher makes an ad request to an exchange 226. The exchange 226 requests inventor data from a user profile system 228. The user profile system 228 identifies the user 222 and provides inventory data to the exchange 226.

The exchange 226 appends the user data to a bid request and sends the bid request to a bidding engine 230. The bidding engine 230 can use the user data to identify suitable ads to present to the user 222.

FIG. 2C illustrates an example of a supply side engine. In this example, user data is sent to multiple exchanges for bidding. A user 242 visits a website or content supplied by a publisher 244. The publisher 244 requests an advertisement to present to the user 242 from a supply side platform 246. The supply side platform 246 sends a request for user data to a user profile system 248.

The user profile system 248 identifies the user 242 and obtains user data about the user. The user profile system 248 sends the user data to the supply side platform 246. The supply side platform 246 sends the user data to multiple exchanges 250*a-c*. Each exchange 250*a-c* may send bid requests to a bidding engine 252.

Figure 3:
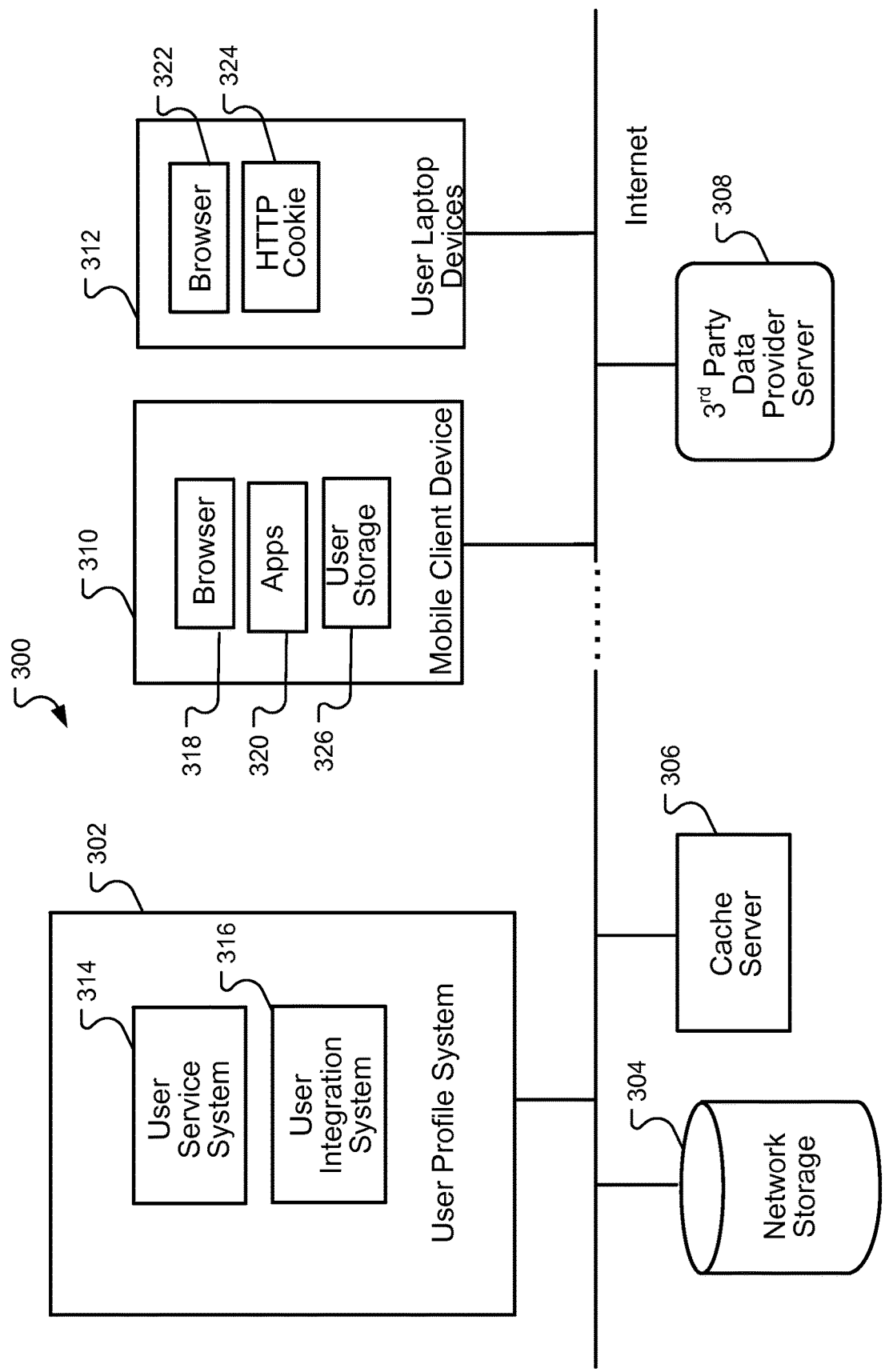
FIG. 3 illustrates an audience profile processing system.

Referring to FIG. 3, a block diagram of another example of an environment 300 for user profile processing is shown. The environment 300 includes a user profile system 302, network storage 304 (for example, a storage area network (SAN)), a cache server 306, a third party data provider server 308, and multiple client computing devices (including, for example, a mobile client device 310 and a user laptop device 312). Other client computing devices can be included, such as mobile phones, a tablet, a laptop computing device, etc. The client device can include, for example, a browser 318 and mobile applications 320. The browser 318 can be a specialized application that is designed to accept and present data provided over the Internet. The mobile applications 320 may be specialized programs designed to run on mobile client devices (such as smart phones or tablets.) A user laptop device 312 may include a browser 322. The browser 322 may include one or more HTTP cookies 324 in order to provide a server with information about the user of the device. In general, an HTTP cookie 324 is a small piece of data sent from a website and stored in the user's browser. HTTP cookies 324 may persist on the user's browser even after the user is no longer viewing the website.

In some embodiments, the user profile system 302 includes two subsystems: a user service system 314 and a user integration system 316. The two subsystems, as well as programs executing on the subsystems, may be stored and executed on one or more physical servers. The network storage 304 may be, for example, a network accessible database. User data can be stored in the network storage 304. The user data can include data for user identification and profile attributes. The user identification and profile attributes may be managed and updated by programs included in the user integration subsystem 312. Data consumers access the user data through the user service subsystem 314. Data service programs are stored and accessed through one or more physical servers. In some embodiments, the one or more physical servers may include a CPU, GPU, main memory, local storage, network interface cards, and display devices for user interactions. All the user data may be stored in the network storage 304. Alternatively, a portion of the user data 326 may be optionally stored on user devices (with permission of the end users) and synchronized with a central database (for example, in the user storage 326). To provide fast access, a portion of data can be stored in caching modules, which may comprise a distributed memory system accessible through a fast network or local memory on processing servers.

The Real-Time System

Figure 4:
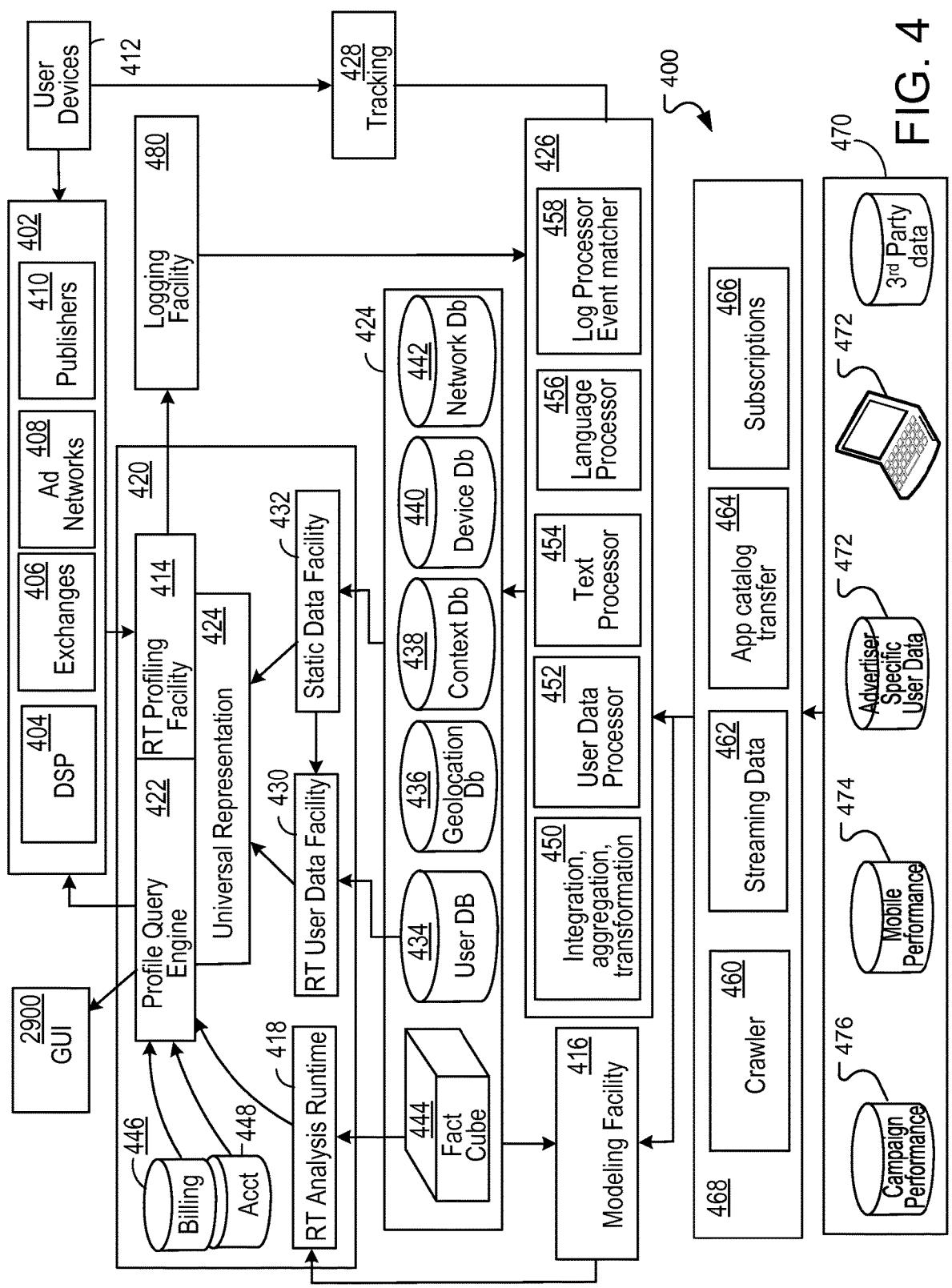
FIG. 4 illustrates a system that provides comprehensive data and analysis for advertising transactions for all networked devices and media channels.

FIG. 4 illustrates an example of a system 400 for systematically capturing and organizing relevant information about ad opportunities. In general, an ad opportunity occurs when a user accesses monetized media content provided by a publisher. The publisher may request an advertisement appropriate for the user. Ad opportunities can be generated from a variety of user devices including, but not limited to, smart phones, tablets, computers, etc. The system can enable various advertising functions, such as targeting, re-targeting, and real-time decision optimizing of ad buying and selling. The system can also generate analytics and reports that can be used to determine the success of a particular advertisement or campaign.

The system 400 can build comprehensive audience profiles using information about the user obtained from the user's online activities along with other data. These audience profiles can be used to assist or direct real-time decisions about buying and selling advertisements. Using the audience profiles, the system can greatly simplify the buying and selling process.

Advertisers may use the audience profiles to assist or determine the selection of media channels to target, the amount of inventory to purchase, the amount to bid and price, the selection of audiences to target, the selection of audiences to retarget, the evaluation of ad opportunities, and the measurement of the value of targeting data sources (for example, third party data available for purchase). For publishers, decisions may include deciding the type of advertisers to sell the inventory and through which channels to sell inventory (e.g., between direct sales and programmatic sales) in order to optimize yield.

The system receives live ad requests from networked devices across different media channels 402. The media channels may include directly connected publishers 410, ad exchanges 406, demand side platforms 404, ad networks 408, and other aggregators. The ad requests may originate from a variety of different user devices 412 (as described above).

The system 400 can collect information about the available advertisement and current campaigns to build a real-time profile (for example, using the real time profiling facility 414). The real-time profile may include data that can help ad delivery and is relevant to campaign performances. The real-time profile may also include metrics that measure the specific availability of advertisements at various time intervals as well as pricing and performance in relation to various advertisers and campaigns.

Real-time profiles can help buyers and sellers target and package the ad opportunities. The data collected from cross media devices and channels can be used to address the inventory. The real-time profile provides a mechanism to target individual users, media contextual groups, locations, and combinations thereof as dictated by inventory channels or campaign or optimization goals. The analysis facilities (including a modeling facility 416 and an RT analysis runtime 418) can analyze and provide a mechanism for combining attribute types to achieve targeting and accuracy that is better than any individual types or level.

Examples of the level and data attribute types are individual users, media channels, publishers, web sites, pages, app ids. Indexes of data attributes including specific media, groups of media, media types, channels, content classifications, keywords, semantics, user specific attributes (such as demographics, behavior, intention, locations, specific devices, and networks). The indexes can also use a combination of these variables.

The real-time processing engine 420 can include a profile query engine 422 that can process queries against inventory profiles. The queries may use a universal representation 424 for all opportunities irrespective of the media channel, type of device, or the network. For example, a query originating from a smartphone may have the same structure as a query originating from a desktop computer. A standardized query structure can enable the profile query engine 422 to address ad opportunities from any networked device and media channel using all types of data (such as media context, specific user level data, location data, time band, and other data).

The standardized query provides a common structure for describing ad opportunities across devices and media channels. The standardized query also provides a unified method to address ad opportunities and perform analysis. This is a significant advantage over existing methods whose applicability is limited to specific devices such as desktop computers.

The profile query engine 422 may connect to varieties of data stores 424, which may include data about devices 440, networks 442, users 434, media context 438, geolocation 436, and analysis facts 444. The profile query engine may include an analysis runtime engine 418 combined with a data query engine (for example the RT user data facility 430 and the static data facility 432). The analysis runtime engine can provide analysis based on learning models that are executed by the analysis runtime engine 418 model at runtime. The profile query engine 422 can also accept data and provide analysis with respect to billing data 446 and account data 448.

A set of processing apparatus 426 extracts, processes, integrates, and evaluates data from different sources and instantiates an inventory vector in real-time. The inventory vectors can be pre-calculated and stored in a persistent data store or in an in-memory cache. Alternatively, inventory vectors can be computed in real-time. The processing apparatus 426 can include integration, aggregation, and transformation functions 450, use data processing functions 452, text processing functions 454, language processing functions 456, and log and event processing and matching functions 458.

Once an ad is selected and presented to a user, the user's interactions with the ad are tracked using a tracking service 428. Performance metrics can be computed using the processing utilities 426 in connection with the inventory attributes. Furthermore, a modeling facility 416 creates and updates a set of metrics that are used to measure and predict ad performances, pricing, and other metrics for time horizon and index of interest.

Ad opportunities may further be ranked and bucketed based on performance measurements, prices, and other metrics. These metrics can further be combined with indexes for the purposes of targeting.

One feature of the profiling system is that targeting attributes used to identify ad opportunities can be measured in relation to ad performance of the advertisement and ranked. Likewise, the value of various sources of data (such as third party data of various providers) can be measured in relation to one or more advertising campaigns or campaign groups.

In some implementations, the system 400 can accept data from different data sources 470 (such networked end user devices or applications 472, advertiser specific user data 472, mobile performance data 474, and advertising campaign performance data 476.) The information can be received using a wide variety of different data receiving mechanisms 468 (such as a web crawler 460, streaming data 462, an application catalog transfer 464, and subscriptions 466).

Real-Time Inventory Processing Steps & Requesting

Figure 5:
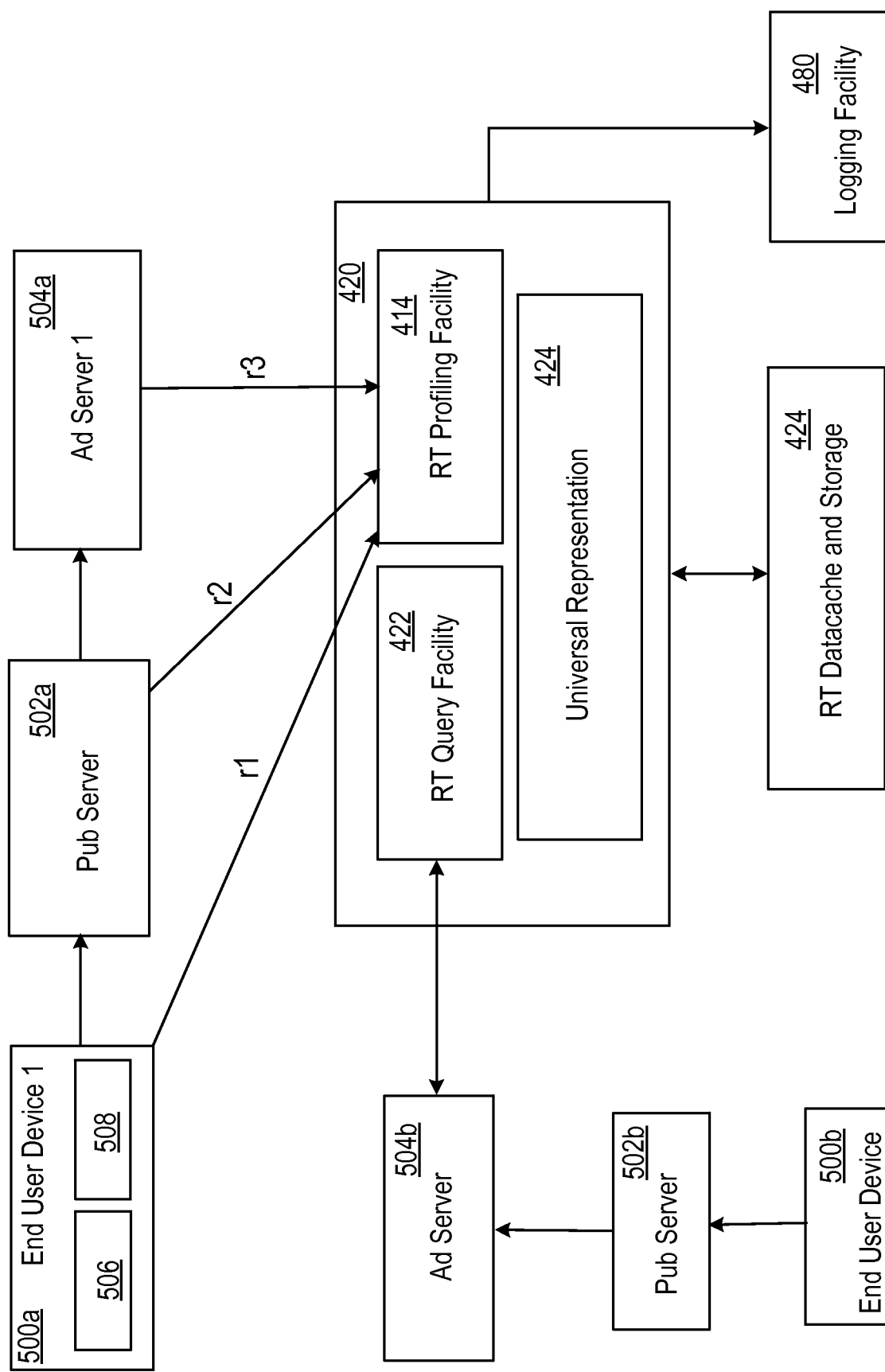
FIG. 5 illustrate details receiving ad opportunities data.

FIG. 5 illustrates an example of receiving ad opportunity requests. An ad opportunity request may come from various sources at a variety of times.

Receiving Request—Identifiers and What Data to Extract

The ad opportunities request may come directly from the end-user device 500a-b and may be forwarded by a publisher 502a-b or by an ad server 504a-b (hosted by exchanges, publisher, ad networks, or other systems). The requests are sent to the real-time profiling facility 414, which associates the data with the user profile (if these is a user profile for the user) or may create a new user profile (if no user profile already exists for the user). Data from the RT profiling facility 414 may be provided to a logging facility 480 for tracking and downstream processing.

Inventory profiles may be created or updated continuously thusly. Queries may be received at any time. A query may be sent from a user who already exists in the database, but who is currently operating a different device or operating the same device using a different application. Because the profile vector captures data of all types, a new profile record may add new information to decision making for the new request if one or more of the updated attributes is relevant to the metrics being measured.

The updated information can be leveraged depending on the situation and the needs of the requester. For example, if the same user is spotted on a different site, it might be a re-targeting opportunity. In some instances the content being viewed and/or the type of device may be determined to be a predictor in the success of an advertising campaign. In this case an unknown user may still be profiled in targeted by selecting a user profile (a look-alike) that accesses similar content and uses a similar device.

Data Extraction Facility (Ad Tag, Media Tag, and Tracking Tag)

As illustrated in FIG. 5, an end user interacts with the media through a networked device. When the user opens the device or an application (such as a Web browser or other app) and accesses predetermined content, a Web Tag 506 or 508 is executed. The Web Tag sends a request r to the RT Profiling facility. The Web Tag can be as simple as an html segment or combined with a scripting language, for example JavaScript (in the case of Web Tag 506). Similar code segment can be executed on different types of user devices. Alternatively, applications written in traditional programming languages (for example, Objective-C for iOS phones or Java for Android devices) to achieve the same result. Ad requests, user behavior tracking, and user interaction with the ad (clicks, conversions) can all be implemented in the similar way.

The publisher of the end user applications may direct the request to a publisher content server or ad server, which may edit the data request parameters, and then forward the updated request r3 to the real-time profiling facility. The request r3 may be further sent to an ad request aggregator, ad network, or ad exchange, which may further update the request. The request may then be forwarded to the real-time profiling facility.

Real time ad requests (including, for example, requests to display ads, user interactions with the media, and most viewed user action requests) can be sent to the system from any networked devices and any channels (for example, as Web and applications media usage tracking from user devices). In addition, near real-time data may also be provided to the system as part of re-targeting (in which publishers or third party data providers send user interaction information on various apps or channels). Furthermore, additional data about the user, media, or devices may be sent to the system through real-time transaction, streaming, or batch using different data transport protocols to an audience integration subsystem.

Ad Request Parameters

Ad requests from media sources contain a set of request parameters, including parameters that are part of the content delivery or communication, such as HTTP header files. The parameter may include, for example, user agent information which contains, among other things, device type or Application meta-data from which the request, the hosts, media types, etc originate. Other data that may be provided as a parameter includes host IP, device IP, and other network information, in particular cookie information. The individual parameters by themselves are often of limited value for ad targeting, but can be used as part of the decision making process.

Publishers, ad networks, and exchanges may add additional parameters, including data about users and media content (among other types of data). Each constituency in the process, however, may use different a set of parameters. Each may have its own way of defining and encoding information. For example, different ad exchanges may encode the same device differently thus resulting in multiple identifiers referencing the same device.

The ad request data may be related to known sources. For example, for IP Addresses, there may be databases that link Wifi IP addresses to limited geo-location data with varying degrees of accuracy. Geo-location databases may associate latitude and longitude data to varieties of geo information.

In addition, data in the public domain, as well as commercial data from third party sources, can also be leveraged. Each of the data sources, however, may use different definitions for the same data, requiring that the data be normalized and integrated before it can be analyzed.

The Common Ad Profile Model (CAPM) described below provides a model for universal representation of ad request data. The CAPM can integrate data from a variety of sources to form a complete picture of ad opportunities. Linking this data to campaign performance can provide complete cross-device and channel analysis for transaction decisions.

Common Ad Opportunity Model and API

Figure 6:
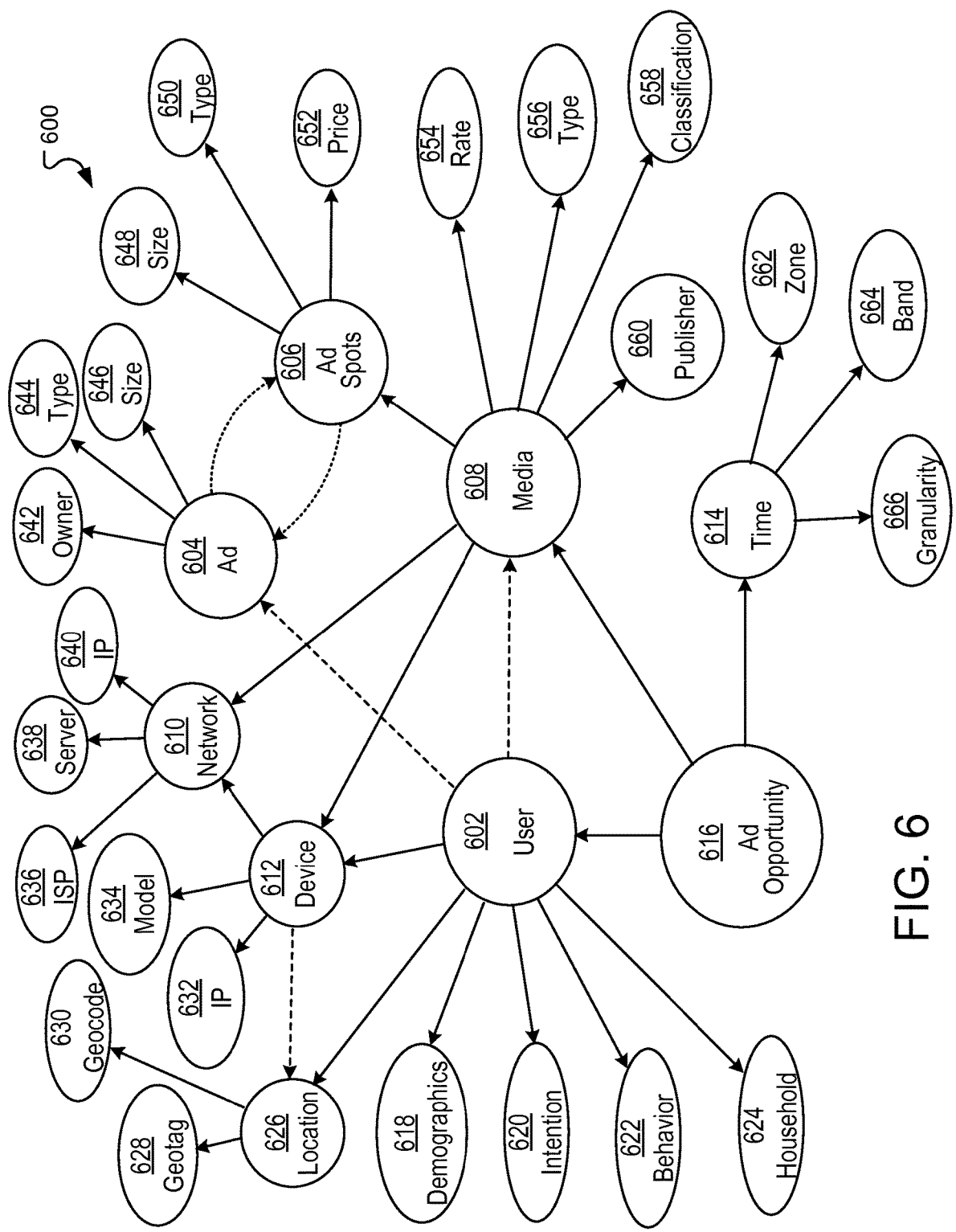
FIG. 6 illustrates a common ad model, where the user interacts with ad spots in a media context with one or more devices in a location context at different times.

FIG. 6 is an illustration 600 of the elements that may be included in the common ad opportunities model. Each ad opportunity 616 can include a user 602 with whom the advertiser may interact by placing one or more ads 604 on ad spots 606 presented with other content or media 608. The user may access the media 608 over one or more communication networks 610 using one or more networked devices 612 during different times 614 of the day.

The user 602 can be associated with demographics information 618, intention information 620, behavior information 622, and/or household information 624. The device 612 can be associated with location information 626 (for example, a geotag 628 and/or a geocode 630), an IP address 632, and/or a model 634 (for example, an iPhone 4s, Samsung Galaxy III, etc.). The communication network 610 can be associated with an Internet Service Provider (ISP) 636, a server 638, and/or an IP address 640. The ad 604 can be associated with an owner 642, a type 644, and/or a size 646. The ad spots 606 can be associated with a size 648, a type 650, and/or a price 652. The media 608 can be associated with a rate 654, a type 656, a classification 658, and/or a publisher 660. The time 614 can be associated with a zone 662, a band 664, and/or a granularity 666.

The CAPM provides a standard mechanism to define relationships and capture parameters to help describe, represent, integrate, analyze, and otherwise make available all the information pertaining to ad requests in real-time. The ad request data can be used to help decision-making and data model for analysis.

The model can define each ad opportunity as a vector of identifiers that together uniquely identify the ad opportunity at a particular time. Each identifier can identify an entity (a circle in the diagram such as user, media, etc.) of ad opportunity. The entity can be further linked to a set of data attributes that define the properties of the entity. The properties can be described using a standard taxonomy and ontology scheme. Relationships between entities can be modeled within the scheme. With this model, the building and gathering of ad opportunity properties model boils down to defining values to the properties.

Accordingly, the following vector may identify each ad opportunity:

[publisherId, mediaId, userId, locationId, SpotId], where publisherId is a unique identifier associated with the media publisher, and mediaId is a unique identifier of the media content. The vector may also include siteId, pageId, applicationId, etc.

UserId can be considered a unique identifier of the user (independent of specific devices). The identifier may be linked to one or more device identifiers and application identifiers that are unique to the device (such as idfa for iOS devices, Android Id for Android devices, and cookies for Web Browsers). Such linkage techniques are described in U.S. Pat. No. 8,438,184, entitled "Uniquely identifying a network-connected entity", which is incorporated herein by reference in its entirety. Techniques are described in U.S. patent application Ser. No. 14/832,930, entitled "Audience on Networked Devices", filed 21 Aug. 2015, which is incorporated herein by reference in its entirety. These device identifiers need to be distinguished from the device identifiers that are used to uniquely identify each type of device. These identifiers may differ with different releases and models from manufactures (for example, iPhone 4 and iPhone 4S may have different identifiers). LocationId can be used to identify locations in the physical world at various levels' granularity. A locationId can be a bucketing identifier using various geocoding schemes, country code, postcode, etc. In some implementations, locationID may be provided as a latitude and longitude. The longitude and latitude may be translated into the appropriate geocoding scheme. For example, the system can translate (or rely on another system to translate) a particular longitude and latitude into a corresponding country code, postcode, etc.

SpotId identifies the location for an advertisement (also known as a creative) in relation to the media where the advertisement is inserted. The SpotId may refer to a frame location in video or linear TV (such as pre-roll, mid-roll, and post-roll). The SpotId may also refer to different positions on a Web page, an association with a Web page, a native ad location, or an audio time frame in audio media.

Each of these identifiers is linked to a set of entry properties that it identifies. Each entity can be described by a set of data attributes that defines the media. A standard naming convention may be used. For example, with for media, the following scheme may be used to define the entity property:

Namespace.MediaType.PropertyType.PropName [Leval1.PropNameLevel2]

NameSpace can be a unique identifier of the definition source that is normally associated with an organization entity and document definition (such as IAB Guideline or Mozilla DMOZ with version numbers). PropertyType can define a content definition (such as Network and Exchange Guildlines or DMOZ directory) while property name is the name of the property, which may further contain a hierarchical definition (such as IAB classification tier1, tier2 for media content).

Each attribute name may further be associated with an identifier that is unique in the global namespace; thus in place of using the name, the identifier may be used. This enables the processing of data from different sources in a unified way, as well as the integration of data from different parties.

Each property may be linked to an ontology and taxonomy definition, which provides detailed naming and descriptions of the identifiers and attributes. The taxonomy and ontology definition might be a specific certain industry domain, definition, source and nature of data, price, and other properties.

Another example of a PropertyType is keywords. Keywords can be selected from a collection provided as a result of indexing the property definitions, such as Web or Applications catalog. Another example of a PropertyType is contextual semantics definition, which, in addition to the terms used to describe the content, also describes the relationships among them.

Attribute Properties Encoding

A common model makes it possible to use the same implementation for all types of data without having to change the code when new data or data types are added to the system. To further simplify the process, each property may be further be assigned a unique identifier following a convention. The naming convention enables new data attributes to be added without collisions.

Typically an ad server and decision engine can be capable of efficiently executing operations such as filtering, targeting, re-targeting, etc. In an ad exchange environment, data often comes from many different sources and may use different types of encoding. A conventional ad server generally only supports a few types of data. The addition of a new type of data often requires redesigning the system. The CAPM model can be used to simplify the incorporation of new targeting variables because the addition of new identifiers does not require server code changes. The benefit generally does not hinder ad operation efficiency. More information leads to better performance.

The model provides a common language with an expandable vocabulary for parties to address ad opportunities and conduct ad transactions. The model provides a simple mechanism for expressing complex rules for targeting and filtering through the conjunction and disjunction of keys, so that any meaningful combination of the variables can be expressed using the language.

Unified Filtering, Targeting, and Re-Targeting

Since the same data and taxonomy definition models are used for all types of data, cross device and cross channel re-targeting may be specified in the same way as targeting.

Basic whitelisting, blacklisting, targeting and re-targeting follow the same process. The process may involve specifying, in the target engine, rules involving filtering users on one or more data items. The process may also involve rules filtering data sets involving identifiers and data attributes, and optionally a score calculated based on attributes.

Targeting can also involve inferred attributes, such as propensity to click, conversion rates, or any user defined attribute. For example, data attributes (adId.conv, score) can be used to target users whose likelihood of conversion on an advertisement exceeds a threshold. The inferred attributes can be related to an adId, which can be a campaign identifier, creative identifier, or a product id whose data is tracked and used to model and compute scores.

Re-targeting involves targeting the same user across media channels and/or devices. For example, a user can be seen on Media Channel A (Site or App) with a laptop and then visit Media Channel B with a tablet sometime later. The information about each visit is sent to the audience data processor, which uses the data processing format to extract the event data attributes and uidKey A and attach it to the user identifier. When the user visits media Channel B using the tablet, the data regarding the users visit using media Channel A (using the laptop) is retrieved and can be used to make ad display decisions.

Notations

To simplify and make more precise the remaining exposition, it is helpful to adopt a set of notations. Denote variable i as the collection of all the identifiers that together with the variable k, being the named data attributes as defined, and the variable v, being the optional value, then all the information regarding ad opportunity is completely characterized by the set of attributes i={identifiers→(k,v)} at an instant of time (i.e., r is completely represented as (i,t)).

In these notations, an advertising data system comprises maintaining basic data about the inventory completely described by i, the ad data j, and the relation specifications about the ads along with building a set of metrics about these entities:

$$ADS=\{i,j,Class(i),Class(j),Rules(i,j),iMetrics,jMetrics,ijMetrics\},$$

where iMetrics, jMetrics, and ijMetrics are metrics on inventory, ads, and interaction, respectively. R(i,j) is a set of rules specifying known constraints that match the inventory vector and the ads. Class(i) and Class(j) represent relations about inventory and ads, such as classification based on different taxonomies, group memberships, etc.

The relations can be specified using grouping rules on the attributes. Any targeting, retargeting, and optimizing rules are an instance of the rule that involves the taxonomies and, optionally, performance metrics. The model and rules provide unifying language for a linkage targeting ad performance on the buy side to pricing and inventory packaging on the sell side.

In the above notation, one aspect of the system can include making, building, and maintaining a comprehensive set of the data items {i,j} available in real time upon request. Yet another aspect of the system is to ensure the relevance of mechanisms for effective usage of the data by way of providing a set of metrics and rules in relation to the decision goals.

Attribute Data Collection

Media Database

Media data attributes comprise data that defines the media content. For Web and application content, these may include: content classifications based on different taxonomy (e.g., IAB taxonomy, DMOZ taxonomy, vender specific taxonomy), keywords or term vectors, nature language encoding of the media, as well as semantic descriptions of the content.

Location Database

A geo-location database can support a location lookup based on keys. The keys can be extracted from the ad request. The keys may include IP address and latitude and longitude of the devices. The geo data may include map data, type of locations, name and type of physical world entities, countries, cities, shopping malls, and schools, as well as demographics and economic data of location.

User Database

The database may be pre-stored using the processing utilities, uploaded in a batch from a third party, or provided as a real-time service.

Different types of data may be stored and maintained in the user profile service subsystem. The data can include user key data and profile attribute data. The user key data can include attributes for identifying users. The profile attribute data can include data that describes the user profiles. User key data and signature data, together with algorithms, help to identify users and retrieve data attributes associated with the user. Requests from data sources are processed by user identifier processors to extract keys and signatures. Data attributes are extracted and matched using proper keys and algorithms.

Each user is uniquely identified by a device and media agnostic identifier, which is linked to a set of devices or media dependent identifiers (referred to as uidKeys). Examples of uid keys include device identifiers such as idfa for iOS devices, UDID or encoded UDID, OpenUDID, Android Id, cookie, MAC Addresses, or any other device identifiers. In addition, a set of user dependent signatures can be associated with each of the unique user identifiers. Examples of signatures include IP address or qualified IP address (such as Wifi address), client response time, device clock offset, device clock skew, location information, such as street segment, media content category, and usage pattern including frequency and time period, etc.

UserDb can maintain a set of tables that store relationships between the identifiers. For example, userId may link one or multiple identifiers to cookies, idfas, androidId, IP, locationId, etc. Each of the other identifiers are linked to a set of data attributes that are in turn described by a set of ontology and taxonomies. The ontology and taxonomies can be made accessible for real-time access and offline data processing. All data attribute types can be also assigned unique identifiers, which are typically different from the name of the attribute. Thus, any data, whether it is user attributes such as behavior, intentions, demographics, source of the data (internal vs third party), media types, channels, etc., can all be described as key and value pairs, and the key can be assigned a universal identifier.

Each unique user identifier is associated with a set of user data attributes for describing user profiles. Each data attribute can be specified by a taxonomy definition that can bucket users into different groups based on their interest or intentions.

Interaction Tables

The fact or interaction database can serve as a single source of all the data related to the media, audience, and ad opportunities. For each ad request, it may append all the relevant data about the inventory, such as user demographics, behavior, intention, psychographics, location, devices, media types, content semantics and classification, ranking, pricing, as well as source meta data.

Each inventory profile can include inventory identifiers and Cartesian products of the advertisement (which can be determined for a creative, campaign, or ad flight) with a set of metrics over a given time horizon (such as hourly). The metrics can be further aggregated to two longer time horizons (such as daily, weekly, monthly etc.) The metrics can include number of requests, number of impression served, clicks, conversions, revenue, margin, live time value, etc.

Privacy Preservation and Identifier Passing

The unique user identifier can serve as a bridge between all other identification keys: the UidKeys. The unique user identifier is kept on the server side. The unique identifier may be securely stored on the server and not revealed to audience data consumers. UidKeys and signatures may be used for real-time data requests as well as integration with third party data from offline and other sources.

In the situation where the uidKey contains personal identifiable information (and the information cannot be stored as a matter of policy), a one-to-one and irreversible mapping to anonymous keys can be used. Such mapping can be obtained by applying a perfect hashing function or general cryptographic hashing function (for example MD5 and SHA-1 with possibility of collision, and SHA-3, RIP-EMD, and RTR0). The hashed key is used as the identifier.

User data attributes may include attributes of different types, including demographic attributes (such as age, gender, ethnicity, and culture identification), psychographic data (such as personality types, culture background, languages the user speaks), interests in products, Web and video content and categories, intention to buy certain products, application usage behavior, past transaction of products of various types, location of travel, residence, interest, devices used to access content; interaction with various media, etc. One or more taxonomies can be used to describe and standardize the encoding and definition of these attributes.

Taxonomy Transformation and UI

Different organizations may use different definitions to define or encode attributes about the same entities. A relationship between the two can be mapped and rules for the mapping can be supplied as part of input to the property processing system during data aggregation and analysis.

Separately, a learning system may be used to discover the relationship. For example, IAB and DMOZ definitions of the same content can be mapped to each other. Such mapping may allow advertisers from different industries to use familiar terms to bucket opportunities, and thereby improve usability.

A userID representing the same person using different devices can be created, and the link to identifiers such as cookies can be maintained. Furthermore, technology can be used to remove duplications and establish links and resolve different userIDs to the same userID.

Parameter Mapping and Publisher (and SDK) Interface

Using the CAPM, a unified user interface may be developed for all ad opportunities. Ad tag, tracking SDK, and a user interaction tracking component can use an interface definition to represent the same data items.

Additionally, data transformation utilities can be developed to map, integrate, and encode data passed as part of the ad request or from third party data sources. These utilities may be used as part of the universal representation facility 2005 and back end processing 2300.

Data sources may come from any channel, such as Web and applications media usage tracking, advertisement requesting, re-targeting tracking, third party data providers etc., and data may be received through real-time transactions, streaming, or batch-using different data transport protocols to the audience integration subsystem.

One or more data records can be retrieved using any of the keys or signatures, or using a data attribute specification following the model and taxonomy specification. To speed up data access, data can be stored in different storage and memory structures, including local memory, distributed memory, and distributed database. Some data may also be stored or cached on the client.

Third Party Data Integration

Data from third parties may be modeled similarly with identifiers associated with data attributes. Third party data attributes can be mapped to existing data through taxonomy mapping, either automatically or using human based rules. Alternatively, the third party data may be integrated as independent attributes. In the simplest case, the same userId keys are used, such as in the case of cookies, idfa or AndroidId. In some scenarios, data is associated with mediaId, email, IP of home wifi router and the incoming data records cannot be resolved to a unique user. In this case, it may be desirable to integrate the data at IP level. Additional signature attributes (such as content, location, and time of usage) can be extracted and used as input to a signature extraction rule. The rule can be resolved to a single user level through unique identification process.

Inferred Attributes and Usage—Real-Time, Low Accuracy Model Usage

In the case scenarios, the audience data attributes may not be directly obtained through tracking or third party. Other attributes are used as predictive attributes (attributes that are predictive of the desired attributes). A supervised learning algorithm is then used to extract an inference model of the desired attributes. The inference model is then used to create inferred attributes for users without such attributes.

Targeting Specification and Execution

In one potential application, the data may be used in regards to targeted advertisements. Following the mentioned design, a unified targeting scheme may be designed irrespective of the devices, media channels, data sources, and other as follows:

1. Receive an ad request r
2. Represent the ad request using the model r=(i,t)
3. For each active ad j, execute:
   i. Specify targeting variables in terms of key value pairs Sj=Subset of I=(identifier→{k,v})
   ii. Check the match between r and Sj Referring to the FIG. 6, new data properties can be added following the conventions. New data types and properties can be added to the targeting system by adding the new data types and properties to configurations without requiring a change to the design.

In addition to being a general scheme of targeting, the above methodology can be implemented efficiently for real time aspects of targeted advertisements. With proper encoding, targeting execution in the algorithm can be implemented as the checking of set membership. There are many efficient algorithms for implementing this type of data structure, and the implementations can be found in mainstream object oriented computer languages such as Java, C++ and libraries for the operation for serial languages such as C.

Arrangements may be implemented to gather data and provide targeting for any device, any type of device, media channel, and data from any source. Furthermore, the methodology generally does not call for frequent code changes on a targeting server.

Analysis

Ad Request Representation and Parameter Mapping

With the common ad opportunities model, each ad request may be mathematically modeled as a realization of the parameters in the representation space and time horizon (Request-r~prob from i), thereby enabling rigorous analysis.

Each of the ad requests may be represented by a vector comprising a unique id, a sessionId, a timestamp that indicates when the request was received, and a set of data attributes that may be represented in key and value pairs based on the CAPM. Ad request r represented below contains the information associated with the ad opportunity that buyers and sellers use to make targets, optimization, bids, auctions and other decisions.

Figure 7:
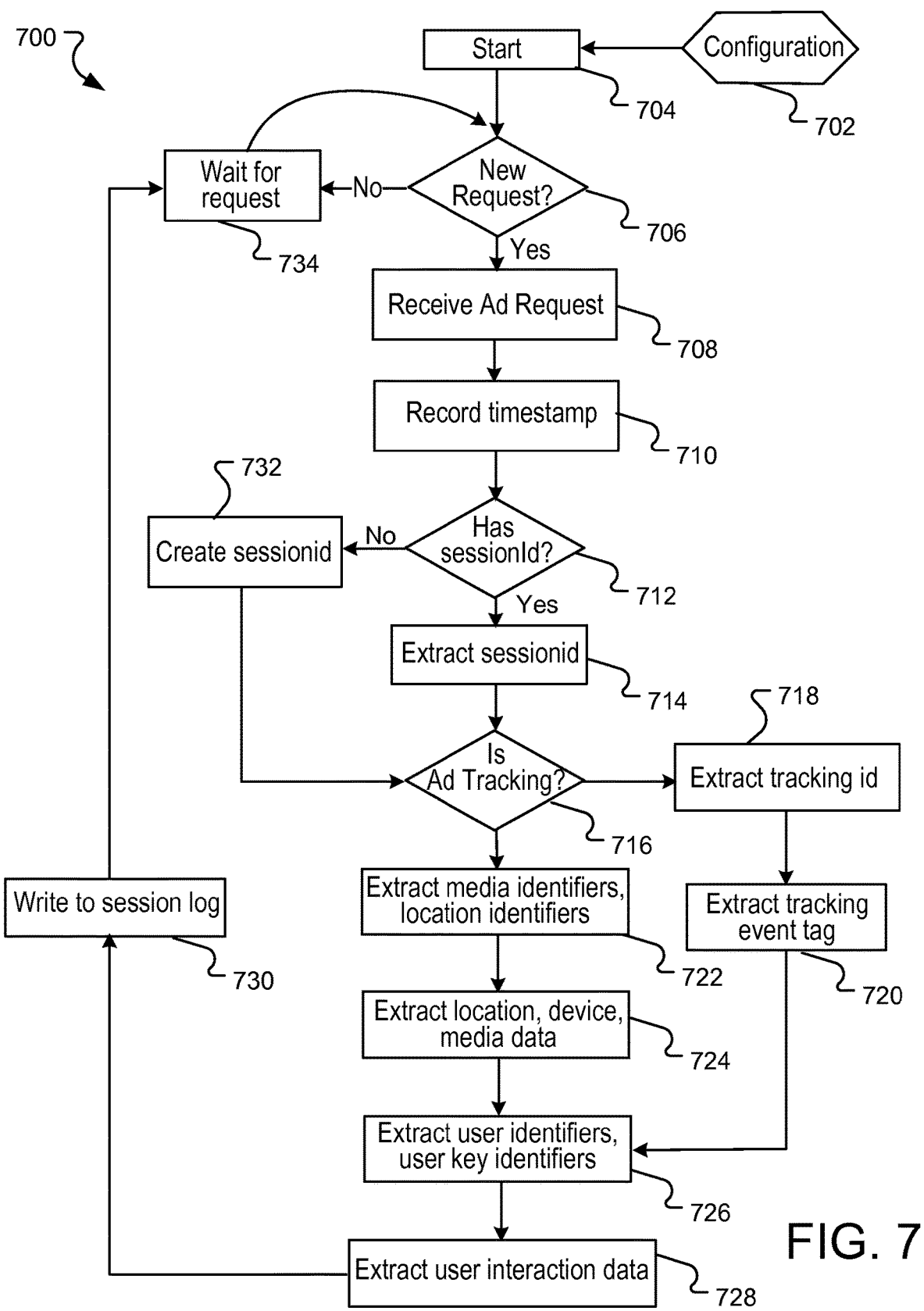
FIG. 7 illustrates the process of creating standard request representation.

FIG. 7 is a flowchart of an example process 700 for obtaining data can be used to populate the CAPM. The process starts 704 and load some configuration information 702. Once the process 700 is initialized the process checks 706 to see if there are any new request to process. If there are not any request to process, the process waits 734 for a new request.

If there is a request to process, the process 700 receives 708 the ad request. The process 700 records 710 a timestamp of when the request was made and/or received. The process 700 can check 712 to see if the request has a session ID.

The request does not have a session ID, the process 700 can create 732 a session ID for the request. If the request does have a session ID, the process 700 can extract 714 the session ID from the request.

The process 700 can check 716 if ad tracking is enabled. If ad tracking is enabled, the process 700 can extract 718 the tracking ID. The process 700 can also extract 720 the tracking of ad tag.

If ad tracking is not enabled, the process 700 can extract 722 media identifiers and location identifiers. The process 700 can also extract 724 location, device, and media data.

The process 700 can extract 726 user identifiers and user key identifiers (as discussed below). The process 700 can extract 728 user interaction data.

Once the data is obtained the process 700 can write 730 to a session log. The process 700 then waits 734 for a new request.

Referring to FIG. 7, an ad request record may be created based on the CAPM:

$$r=[sessionId, i\text{-vector} \rightarrow SetOf(key,value), timestamp].$$

It is noted that although the word ad is used to reference a request, its usage is not limited to representing requests for advertisements. The same representation may be used to request profiling without serving an advertisement, as well as for tracking user interactions, ad performance, and real-time third party data integration.

The CAPM enables the creation of a universal representation of all types of runtime requests to the system. For example, data sent to the tracking server from mobile handheld device as a result of accessing a call-back pixel (a small image defense and HTTP request to a particular server), of executing script on a mobile Web page, and code executing as part of an SDK for mobile apps can use the same ad request vector.

Each data attribute may be identified by a unique identifier: a name, and name space. Each data attributed may be linked to a data structure that defines source, version, and taxonomy definition. The taxonomy definition further defines properties of the data attributes, such as type, encoding algorithm, etc. Resolution of relationships between attributes from different sources and types can be defined by mapping rules or based on data structures, including identifiers, data attributes, name space, taxonomy and sources.

Ad request vectors follow the same model for both real-time and backend processing, but different attributes may be instantiated depending on the application scenario. In each case, ad request vectors can be constructed by matching inventory identifiers using an Inventory Profile Service. The Inventory Profile Service can provide real-time access to inventory profiles through the matching of identifiers or data signatures. The Inventory Profile Service may store the inventory profile data for fast retrieval, for example, using local servers, and distributed memory storage, or by storing data on end user devices.

Linking Ad Request to Performance Events

Real-time decision making involves the system. The ad server or decision engine 2800 may send a request to the system. The real-time data query engine 2001 retrieves one of more of the data points and returns the data points to the requesting system.

The relevance of each of the data attributes may be analyzed by linking the request to the outcome performance of the ad, with or without having the data involved in the decision making process. If the data is involved in the process, the decision server may call back the tracking server and provide an indication of the usage of the data. The efficacy of the data can be analyzed by analyzing the incremental value of serving ad j to the request.

The outcome of serving one or more ads can be link back to the requests. There are different ways to make the linkage. For example, the system may attach a sessionId, a unique identifier to the request, or a different tracking tag, and pass it along with the data to 2800. 2800 may then embed the id in a tracking pixel and instruct the end user device or a third party tracking server to call back to the tracking component 2600. The tracking component 2600 may log the tracking event along with the sessionId. There are situations in which the destination server ignores the pixel and the tracking identifier may not be provided to the system. In this case, the user identifier or signatures may be used to track the events.

The variable i represents the complete set of information of inventory of ad opportunities. Thus the ad request opportunity arriving at time t, r=(sessionId, i, t), and the outcome of ad j can be linked. Additionally, whether the data attributes specified by the query term q were involved in the decision rules can be captured.

Pricing and Other Information

In the case of DSP decision engine or ad server integration, the decision engine may also send back other information, such as bidding price, winning price, clearing price, revenue etc.

Ad Opportunities Profiles and Core Metrics

With the ad requests data, performance tracking, pricing, and other data in the decision funnel, analysis actionable metrics may be determined and provided as a driver to both human and algorithm based decision making By way of illustration, the analysis profile may comprise a specification:

{i,j,Class(i),Class(j),R(i,j),iMetrics,jMetrics,ijMetrics}

In the above, a classification on inventories i or ad j specifies a membership or index grouping on the data attributes. It may be a label on one or more of the data attributes or identifiers. For example, labeling some media type mobile, desktop, or custom specified labels. Similarly, classification on ad j may be associated with an industry classification of the ad, or a custom speciation may be made. In practical implementation, these relations may be modeled as relations between tables, constraints on tables, or another column in the database that specifies marks the grouping.

Recall iMetrics and jMetrics are metrics on inventory respectively, and ijMetrics are the interaction metrics. The metrics can be any measurable quantities that may be linked back to the ad request. The following is a set of basic metrics of each category:

Number of requests for each subset of {k}, such as request per user, site, app, etc., and numbers received per ad j.
Impressions served at the same level
Clicks at the above index levels
Conversions at the above index levels
Other useful counts include
Request, impressions, conversions passing different decision funnel The finest granularity that the metrics are computed is at number of request per (i, j) pair. And the rest of the metrics can be aggregated based on the pair. Storing metrics per request and aggregating to determine desired metrics at run time can greatly reduce the necessary size of the database. For example, storing aggregated metrics at the user identifier level results in a database of a size that is proportional to the size of the sites or apps and number of users.

One aspect of a method to overcome the high dimensional problem is to generate metrics on demand. In this method, metrics are computed as required for a selected set of identifiers and data attributes. Another potential approach to mitigate the high dimensional problem is to aggregate and store parts of the processed data for separate sets of identifier types. This may include storing data at the level of individual users, media, and ad interaction facts with regard to media and a set of common user attributes, resulting in a user database, media database, and Interaction Fact database. The stored results and on demand processing can be combined together for subsequent query and processing.

The user database may include user identifiers that are linked to identifiers associated with the user in specific device or app settings. For example, the identifiers can include device identifiers, cookies and a set of signatures composed of usage patterns, locations, and device characteristics. User data attributes may include media usage behavior, ad interactions, purchase, and other data usage behavior, and other attributes that can come from observed ad request data, open Internet, and third party sources.

Example Core Metrics

Each of the metrics can be aggregated following the aggregation process for historical data and/or determined using the learning facility.

First basic inventory profile statistics are aggregated and projected. The inventory profile stats can include a total number of unique users during a given time period and a total number of unique users on a selected inventory index of interest (e.g. site, app, level). The total number of visits can also be collected and aggregated on a subset of inventory indexes. For direct publishers we have the relation TotalRequest($i,t$)=$\Sigma_u$NumVisits($u,i,t$)

For all real time bidding (RTB) ad requests, the availability of traffic for different time period t (assuming t is discretized and the data aggregated from a given historical time up to the current time):

NumberRequest($i,t$)=NumberTotalRequest*Prob($i,t$)

For subset of interest, the following quantity can be computed for inventory segment Index_i NumberRequest(Index_$i,t$)
  =NumberTotalRequest*Prob(Index_$i,t$)

For example Index_i may be a segment of the users, per site or site groups, per app or app groups.

The winning rate of inventory i may be modeled as a function of bidding price:

WinRate$(i,t)$=WinRateModel(BidPrice,$i,t$)+∈

For BidPrice≥FloorPrice and WinRate in the range the range between [0,1].

In practice the winning rate is calculated using only a few data attributes and media dimensions. The ε is a random term that captures the competition dynamics and other random factors.

In addition, metrics that are specific to particular dimensions of the ad opportunity can be defined and data extracted. For example, metrics surrounding the user can be used to compute the lifetime value of the user. The lifetime value can be computed and model based historical data of the user interactions, as well as other data.

A set of events ActionX, with ActionX being Clicks, Conversions, and other actions that the user performs that can be tracked:

$$NumEventX(t, i, j) = \sum_u NumEventX(u, i, j, t)$$
$$= \sum_u NumRequest(s) * P(u|s) * XRate(u, i, j, t)$$

and assuming one exposure of the ad j to the user, the ActionX rate

XRate$(u,i,j,t)$=Prob(EventX on $j|u,i,t$)

Aggregation and Modeling

Figure 8:
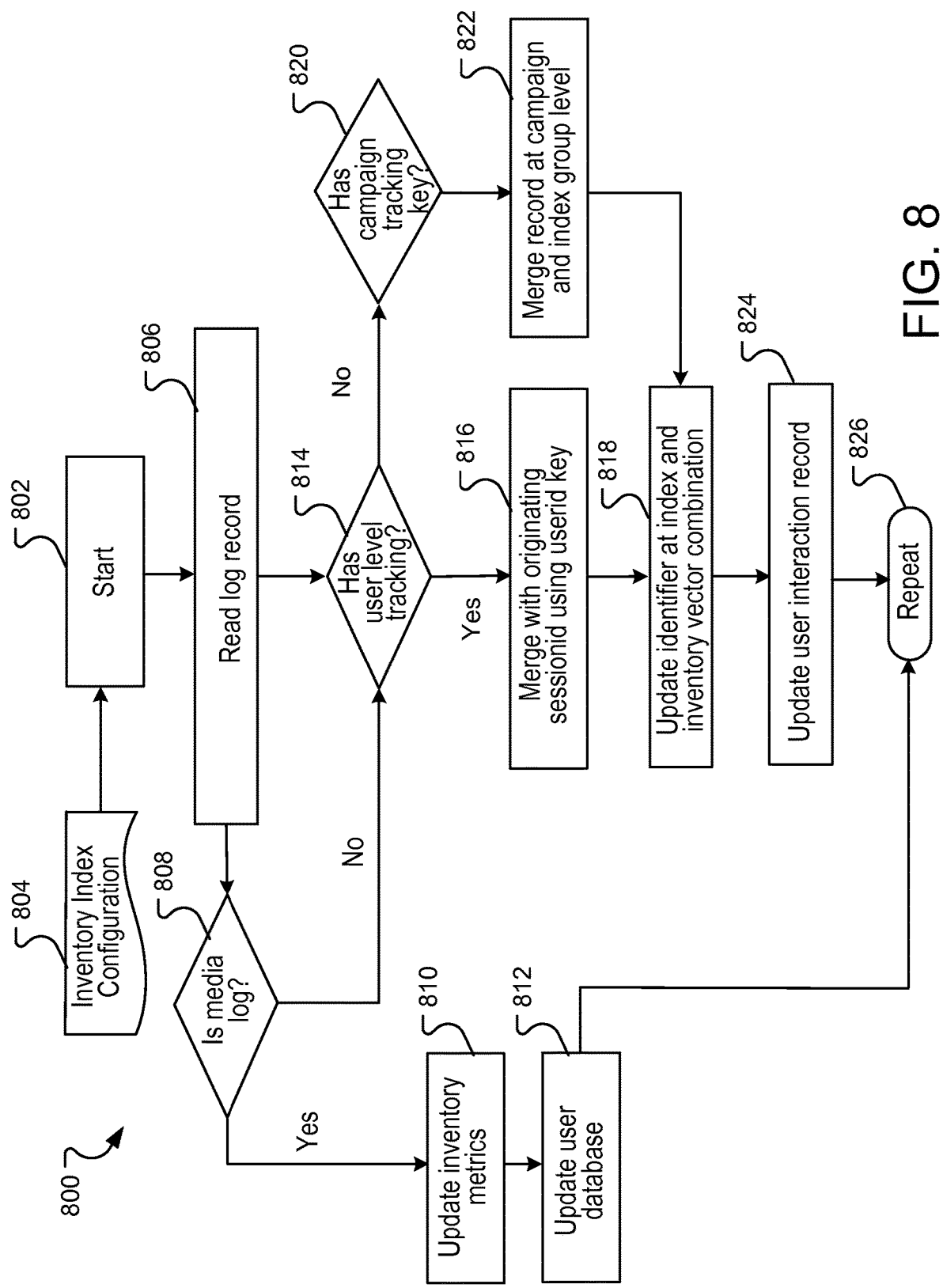
FIG. 8 shows the logic processing process flow for building and updating basic inventory metrics

FIG. 8 is a flow chart of an example process 804 aggregating data. The process 800 starts 802 by loading an inventory index configuration 804. Once the configuration is loaded the process 800 reads 806 a log record.

The process 800 determines 808 whether the log record is a media log. If the log record is a media log the process 800 updates it hundred 10 inventory metrics. The process 800 also updates 812 a user database. The process then repeat 826.

If the log record is not a media log, the process 800 determines if the log has 814 user level tracking. In some implementations, the process 800 determines if the log has 814 user level tracking even if the log record is a media log.

If the log record has user level tracking, the process 800 merges 816 the log record with the originating session ID using a user ID key.

The process 800 updates 816 identifiers at index and inventory vector combinations.

If the log record does not have user level tracking, the process 800 determines if the log record has 820 the campaign tracking key. In some implementations, the process 800 determines if the log record has 820 the campaign tracking key even if the log record has user level tracking.

The process 800 merges 822 the log record at the campaign index group level.

The process 800 updates 824 user interaction records.

The process 800 then repeats 826.

Referring to the process illustrated in FIG. 8, each of the metrics may be aggregated for a subset of indexes using an inventory vector over different time horizons. The metrics may also be aggregated for a subset or all of the ads.

Metrics can be computed by aggregating data based on SessionID with respect to different media identifiers, user identifiers, location identifiers, etc. For example, by first linking the ad request to sessionId subsequent to ad serving.

Receiving performance tracking identifiers and then aggregating metrics by mediaId, userId, or locationId, etc. For example, for app download campaigns, the installation metrics by sessionID can be generated by linking the metrics data to the idfa (stored in the ad request vector) and then to installation tracking data.

Aggregating at all combinations of indexes of inventory and ad pair (i, j) can be expansive and, under some circumstances, impractical to execute. One way to overcome this expense is to incrementally identify a subset of keys that are more informative in relation to metrics of interest. A priori knowledge about the data attributes serves as an important guide, and it may also be guided by data. One critical aspect of modeling described herein is geared toward overcoming such high dimensionality.

A subset of indexes may include separate groups of media content, location at different granularity, user level attributes (demographics, behavior, and intention), metrics on data attributes of particular data vendors, etc. The actual processing steps remain invariant. And the common data model makes it possible to develop one single program for all of these scenarios.

Aggregation whence creates metrics over a subset of data attributes of interest:

{identifiers,$K_i$,$j$,$i$Metrics,$j$Metrics,$ij$Metrics|$t$∈[−$T$,0]},

Where K={k} denotes a subset of the data attributes in the key value pairs of ad opportunity vector i={(k,v)}, and T>0 a historical time of selected granularity that may be seconds, minutes, hours, or days.

Likewise, modeling involving one of more metrics may produce the value to future time:

{identifiers,$K_i$,$j$,$i$Metrics,$j$Metrics,$ij$Metrics|$t$∈(0,$T$]},

Putting together, the processes whence put together profiles of ad opportunities addressable by data attributes using user data, media context, device and network context, location, media contextual data, channels, and required metrics that measures availability pricing, and metrics that measures business and performance outcome of associating ads with the opportunities in time horizon of interest and granularity.

The data may be stored in a database on computed in real-time answering to queries for media planning, channel allocation, targeting, optimization, and many other questions.

The queries may involve analytics functions such as those defined in SQL99 and others, and the selected results may be used with a visualization tool for analysis, and may be integrated with optimization and modeling system to support learning and analysis.

The following show the usage by query of formulating queries finding answers to a few problems.

Static and User Models

With high dimensions, data is vacuous for most inventory vectors, especially along the user and media dimension. This fact may be leveraged to overcome the dimensionality problem in the current situation and build models for XRate. To do this, it is ad request may be modeled as a sample following the probability inventory distribution from a single a set of inventory sources in the i space. The distribution can be resampled to create new samples and improve learning performance.

Write i=(m, l, u, t)=(s, $u_{sp}$), with s denoting the common variables that are independent of users, and $u_{sp}$ user specific data. A model of the following form may be built:

XRate$_{ij}(t)=f(g(s),h(u_{sp}))$

Layered model: Ad only component+media component, media ad_interaction component+user specific component. t historical==Aggregate; t future model on historical data.

The process is illustrated using $XRate_j(i)$, but it should be apparent it applies to other metrics. The following methodology demonstrates the learning function:

Start:
1. Select request in a given time horizon $[-T, 0]$ following request distribution D, and set time granularity
2. Aggregate vector $\{(XRate, s, t)\}$ by aggregating out user dimensions
3. Build model on aggregated data $XRateij(t)=g(s)$
4. Aggregate performance data at user level on D to create data set (uid, Xrate, $U_{sp}$, t)
5. Build user level mode $XRate_{ij}(t)=g(s)$
6. Create dataset $\{r,g(s),h(u_{sp}): r \in D\}$ and learn the new $f(g,h)$ on this set.

End

Many variations of the algorithms can be developed, for example. In particular, different sampling mechanism can be used to create the data set learning function f, and different forms of f can be assumed.

Scoring of Targeting Variables

It is a common practice for advertisers to select a set of data attributes (such as demographics) to help reach their desired audience and obtain their ad goals. However, it is often unclear how effective or useful the targeting is.

Metrics provide a systematic method to solve the problem. According to the method, each attribute may be measured and the relevance of the attribute may be quantified against the goals. The following listing illustrates one potential technique.

1. Select the set of ads of interest $J=\{j\}$ and metrics
2. For each $j \in J$ create training and test data sets (TrainSet and TestSet) containing data attributes of interest, defaulting to all attributes. Select relevance metrics, such as Measure square, entropy, ROC, and others. Default to lift Lift(s)
3. For each targeting attribute $s \in \{identifers,k\}$
   a. Create a model for predicting value ijMetrics(s) on TrainSet
   b. Generate data set dataset $\{ijMetrics(s): s \in TestSet\}$, and compute score metrics Lift(s)
4. Rank the targeting data by sorting or Lift(s) of given percentile Although training and testing dataset are used to compute the scores, it is noted other ways of creating effective metrics can be used, such as cross-validation, bootstrap, and others.

Predictive Targeting and with all Variables

After a campaign has been running for a period of time and there is enough data to model the ijMetrics(r), information of all relevant variables may be used to create a model. The model can then be deployed in real-time to help select matching ad opportunities for each ad.

A simple algorithm involve selecting a threshold and on the ijMetrics:

Setup: Input $j, ijMetrics(i), Threashod_j$.

Do
1. Receive request r
2. Retrieve data $r \to i$
3. Compute ijMetrics(i)
4. Target if $ijMetrics(i) > Threahod_j$ End Ad Opportunity/Inventory Ranking Each ad opportunity may be ranked on a set of metrics such as relevance, utility value, cost, and volume. More specifically, ijMetrics along with iMetrics can be used to rank inventory for one or more ads with respect to different inventory attribute indexes specified by Class(i), such as publishers, site or application types, user groups, location, variables, or time periods. The metrics may be computed by aggregating out other variables and grouping by the index of interest. Similarly, inventory can be ranked in relationship to different advertising groups as specified by Class(j).

Thus, inventory may be ranked based in a similar way on segments defined using the above language, sorting of different segments and a sufficient sample size provides a systematic mechanism to measure the importance of segments in relation to different advertising goals, thereby removing the guess work.

Value and Incremental Value of Data

The value of data of various types and sources can be measured in terms of their value and incremental value to the existing data set.

Let $D_1$ and $D_2$ be two sources of data that contribute to the data attributes in i for a collection of ad requests. The following algorithm may be used to computes to value these datasets with respect to decision algorithms and metrics ijMetrics:

Setup: R=Collection of All Requests, $D_\alpha$, $\alpha=1, 2$, ad j
1. Create data sets: $D_3=D_1+D_2$
   Do:
   a. Receive request r from R
   b. Append data $D_\alpha$ to i with probability p, default to 0.5
   c. Update r with i
   d. Add r to the $R_\alpha$ if and only if $D_\alpha$ was used in Step
   e. Make apply algorithm A using r
   f. Track event for metrics ijMetrics and link the corresponding request set
   End
2. Compute $ijMetrics(D_\alpha)$, $\alpha=1, 2, 3$
3. Output: Value of data set $D_2$: $ijMetrics(D_2)$ and incremental value of $D_2$ over $D_1$ is $1-ijMetrics(D_2)/jMetrics(D_3)$, measurement of increase during to adding of data $D_2$.

The value and incremental value of the data set depends on how the data is used by the decision algorithm. The above algorithm can be used for computing the value in real-time on observed data. And it can also be with experimental data offline. And the decision algorithm represents the decision process and a subset of the decision process such as a modeling algorithm.

Channel Attribution and Optimization

To reach the same user or different user groups, advertiser may use different channels, such as TV, desktop, mobile phones, tablet, and others. A specific amount of ad budget may be adjusted based on the performance of an individual channel. To help the process, performance metrics may be computed for a given time horizon for various channels involved.

Channels can be defined by specifying a classification on media dimensions:

$Class(i)=Class(m) \in \{Chanel_1, Channel_2, \ldots, Chanel_K\}$

Metrics may be computed at the channel level. Response metrics tracked at the request level and aggregated to the channel level by running an aggregation function. The aggregation function groups by channel (e.g. groups based on a channel variable) to produce channel metrics. As an illustration, for example:

$$\left\{ Channle_c, \frac{\sum_{i \in Channel_c} ijMetrics}{SizeOf(Channel_c)e}, c = 1, 2, \ldots, K \right\}$$

Other metrics and aggregation functions may be used. The computation may be done for different time horizons. The aggregated metrics can then be served as an input to decision engine or used by human operator to guide budget allocation (for example by solving an LP optimization problem for given time horizons or simple ranking).

Figure 9:
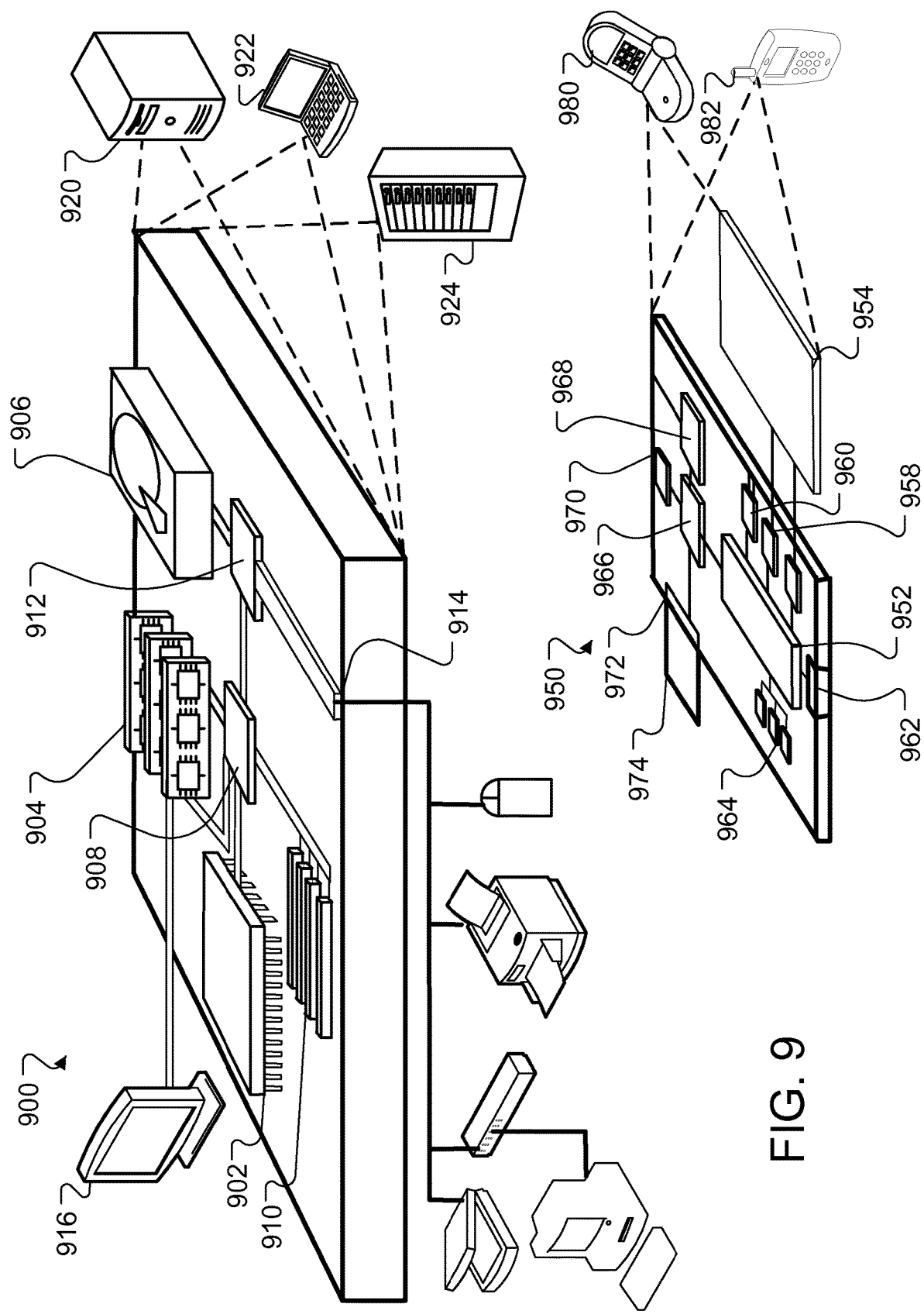
FIG. 9 illustrates an example of a computing device and a mobile computing device that can be used to implement the techniques described herein.

FIG. 9 shows an example of example computer device 900 and example mobile computer device 950, which can be used to implement the techniques described herein. For example, a portion or all of the operations described above may be executed by the computer device 900 and/or the mobile computer device 950. Computing device 900 is intended to represent various forms of digital computers, including, e.g., laptops, desktops, workstations, personal digital assistants, servers, blade servers, mainframes, and other appropriate computers. Computing device 950 is intended to represent various forms of mobile devices, including, e.g., personal digital assistants, tablet computing devices, cellular telephones, smartphones, and other similar computing devices. The components shown here, their connections and relationships, and their functions, are meant to be examples only, and are not meant to limit implementations of the techniques described and/or claimed in this document.

Computing device 900 includes processor 902, memory 904, storage device 906, high-speed interface 908 connecting to memory 904 and high-speed expansion ports 910, and low speed interface 912 connecting to low speed bus 914 and storage device 906. Each of components 902, 904, 906, 908, 910, and 912, are interconnected using various busses, and can be mounted on a common motherboard or in other manners as appropriate. Processor 902 can process instructions for execution within computing device 900, including instructions stored in memory 904 or on storage device 906 to display graphical data for a GUI on an external input/output device, including, e.g., display 916 coupled to high speed interface 908. In other implementations, multiple processors and/or multiple busses can be used, as appropriate, along with multiple memories and types of memory. Also, multiple computing devices 900 can be connected, with each device providing portions of the necessary operations (e.g., as a server bank, a group of blade servers, or a multi-processor system).

Memory 904 stores data within computing device 900. In one implementation, memory 904 is a volatile memory unit or units. In another implementation, memory 904 is a non-volatile memory unit or units. Memory 904 also can be another form of computer-readable medium (e.g., a magnetic or optical disk. Memory 904 may be non-transitory.)

Storage device 906 is capable of providing mass storage for computing device 1300. In one implementation, storage device 906 can be or contain a computer-readable medium (e.g., a floppy disk device, a hard disk device, an optical disk device, or a tape device, a flash memory or other similar solid state memory device, or an array of devices, such as devices in a storage area network or other configurations.) A computer program product can be tangibly embodied in a data carrier. The computer program product also can contain instructions that, when executed, perform one or more methods (e.g., those described above.) The data carrier is a computer- or machine-readable medium, (e.g., memory 904, storage device 906, memory on processor 902, and the like.)

High-speed controller 908 manages bandwidth-intensive operations for computing device 1300, while low speed controller 912 manages lower bandwidth-intensive operations. Such allocation of functions is an example only. In one implementation, high-speed controller 1308 is coupled to memory 904, display 916 (e.g., through a graphics processor or accelerator), and to high-speed expansion ports 910, which can accept various expansion cards (not shown). In the implementation, low-speed controller 912 is coupled to storage device 906 and low-speed expansion port 914. The low-speed expansion port, which can include various communication ports (e.g., USB, Bluetooth®, Ethernet, wireless Ethernet), can be coupled to one or more input/output devices, (e.g., a keyboard, a pointing device, a scanner, or a networking device including a switch or router, e.g., through a network adapter.)

Computing device 900 can be implemented in a number of different forms, as shown in the figure. For example, it can be implemented as standard server 920, or multiple times in a group of such servers. It also can be implemented as part of rack server system 924. In addition or as an alternative, it can be implemented in a personal computer (e.g., laptop computer 922.) In some examples, components from computing device 900 can be combined with other components in a mobile device (not shown), e.g., device 950. Each of such devices can contain one or more of computing device 900, 950, and an entire system can be made up of multiple computing devices 900, 950 communicating with each other.

Computing device 950 includes processor 952, memory 964, an input/output device (e.g., display 954, communication interface 966, and transceiver 968) among other components. Device 950 also can be provided with a storage device, (e.g., a microdrive or other device) to provide additional storage. Each of components 950, 952, 964, 954, 966, and 968, are interconnected using various buses, and several of the components can be mounted on a common motherboard or in other manners as appropriate.

Processor 952 can execute instructions within computing device 950, including instructions stored in memory 964. The processor can be implemented as a chipset of chips that include separate and multiple analog and digital processors. The processor can provide, for example, for coordination of the other components of device 950, e.g., control of user interfaces, applications run by device 950, and wireless communication by device 950.

Processor 952 can communicate with a user through control interface 958 and display interface 956 coupled to display 954. Display 954 can be, for example, a TFT LCD (Thin-Film-Transistor Liquid Crystal Display) or an OLED (Organic Light Emitting Diode) display, or other appropriate display technology. Display interface 956 can comprise appropriate circuitry for driving display 954 to present graphical and other data to a user. Control interface 958 can receive commands from a user and convert them for submission to processor 952. In addition, external interface 962 can communicate with processor 942, so as to enable near area communication of device 950 with other devices. External interface 962 can provide, for example, for wired communication in some implementations, or for wireless communication in other implementations, and multiple interfaces also can be used.

Memory 964 stores data within computing device 950. Memory 964 can be implemented as one or more of a computer-readable medium or media, a volatile memory unit or units, or a non-volatile memory unit or units. Expansion memory 974 also can be provided and connected to device 950 through expansion interface 972, which can include, for example, a SIMM (Single In Line Memory Module) card interface. Such expansion memory 974 can provide extra storage space for device 950, or also can store applications or other data for device 950. Specifically, expansion memory 974 can include instructions to carry out or supplement the processes described above, and can include secure data also. Thus, for example, expansion memory 974 can be provided as a security module for device 950, and can be programmed with instructions that permit secure use of device 950. In addition, secure applications can be provided through the SIMM cards, along with additional data, (e.g., placing identifying data on the SIMM card in a non-hackable manner.)

The memory can include, for example, flash memory and/or NVRAM memory, as discussed below. In one implementation, a computer program product is tangibly embodied in a data carrier. The computer program product contains instructions that, when executed, perform one or more methods, e.g., those described above. The data carrier is a computer- or machine-readable medium (e.g., memory 964, expansion memory 974, and/or memory on processor 952), which can be received, for example, over transceiver 968 or external interface 962.

Device 950 can communicate wirelessly through communication interface 966, which can include digital signal processing circuitry where necessary. Communication interface 966 can provide for communications under various modes or protocols (e.g., GSM voice calls, SMS, EMS, or MMS messaging, CDMA, TDMA, PDC, WCDMA, CDMA2000, or GPRS, among others.) Such communication can occur, for example, through radio-frequency transceiver 968. In addition, short-range communication can occur, e.g., using a Bluetooth®, WiFi, or other such transceiver (not shown). In addition, GPS (Global Positioning System) receiver module 970 can provide additional navigation- and location-related wireless data to device 950, which can be used as appropriate by applications running on device 950. Sensors and modules such as cameras, microphones, compasses, accelerators (for orientation sensing), etc. may be included in the device.

Device 950 also can communicate audibly using audio codec 960, which can receive spoken data from a user and convert it to usable digital data. Audio codec 960 can likewise generate audible sound for a user, (e.g., through a speaker in a handset of device 950.) Such sound can include sound from voice telephone calls, can include recorded sound (e.g., voice messages, music files, and the like) and also can include sound generated by applications operating on device 950.

Computing device 950 can be implemented in a number of different forms, as shown in the figure. For example, it can be implemented as cellular telephone 980. It also can be implemented as part of smartphone 982, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor. The programmable processor can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a device for displaying data to the user (e.g., a CRT (cathode ray tube) or LCD (liquid crystal display) monitor), and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such back end, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method for providing analysis for advertising transactions comprising:

creating, in a processor of a computer, profiles for a plurality of ad requests by aggregating inventory metrics using one or more identifiers according to an ad model, wherein:
- the ad model provides a common language for conducting analysis and exchanging data between different sources;
- the creating comprises reducing a necessary size of one or more databases by computing the inventory metrics at a finest granularity of a number of ad requests per pair of (i,j), wherein i is an inventory of advertising impressions and j is an advertisement presented to a user, and remaining inventory metrics are aggregated based on the pair;
- the aggregated remaining inventory metrics are stored on a per request basis in the one or more databases during run time;

identifying, using the processor in the computer, a plurality of inventory vectors based on the profiles, wherein the plurality of inventory vectors uniquely identify an ad opportunity at a particular time;

creating, in the computer using the processor, a profile database, of the one or more databases, of ad performance comprising performance metrics for each inventory vector, associated data attributes, and ad identifiers;

providing, using the processor in the computer, predictions of ad performance metrics as function of time, index of inventory attributes, and the data attributes; and providing, using the processor in the computer, a user interface to enable a user to query one or more metrics associated with the one or more identifiers.

2. The computer-implemented method of claim 1, wherein the inventory metrics comprise at least one of number of request, click through rate, conversions rate, prices, bid floors and the time horizon.

3. The computer-implemented method of claim 1, wherein the predictions comprise at least one of bid prices as function of index of inventory; a winning rate as a function of price and index of inventory, inventory identifiers, index of identifiers, and time; click through rate, conversion rate, and life time value.

4. The computer-implemented method of claim 3, wherein the predictions are associated with a measure of accuracy and confidence level.

5. The computer-implemented method of claim 3, wherein one or more data attributes are assigned a value, and incremental value in using the data.

6. The computer-implemented method of claim 1, wherein the one or more identifiers separate the aggregated inventory metrics at a level of individual users, media, and advertisement interaction facts resulting in a user database, a media database, and an interaction fact database, of the one or more databases.

7. The computer-implemented method of claim 6 wherein the user database comprises user identifiers that are linked to identifiers associated with the user in settings of a device or application.

8. A non-transitory computer readable medium, encoded with computer program instructions that when executed by one or more computers cause the one or more computers to perform operations for providing data for providing analysis for advertising transactions comprising:
creating profiles for a plurality of ad requests by:
- aggregating inventory metrics using one or more identifiers according to an ad model, wherein the ad model provides a common language for conducting analysis and exchanging data between different sources; and
- the creating comprises reducing a necessary size of one or more databases by computing the inventory metrics at a finest granularity of a number of ad requests per pair of (i,j), wherein i is an inventory of advertising impressions and j is an advertisement presented to a user, and remaining inventory metrics are aggregated based on the pair;

the aggregated remaining inventory metrics are stored on a per request basis in the one or more databases during run time;

identifying a plurality of inventory vectors based on the profiles, wherein the plurality of inventory vectors uniquely identify an ad opportunity at a particular time;

creating a profile database of ad performance comprising performance metrics for each inventory vector, associated data attributes, and ad identifiers;

providing predictions of ad performance metrics as function of time, index of inventory attributes, and the data attributes; and providing a user interface to enable a user to query one or more metrics associated with the one or more identifiers.

9. The non-transitory computer readable medium of claim 8, wherein the inventory metrics comprise at least one of number of request, click through rate, conversions rate, prices, bid floors and the time horizon.

10. The non-transitory computer readable medium of claim 8, wherein the predictions comprise at least one of bid prices as function of index of inventory; a winning rate as a function of price and index of inventory, inventory identifiers, index of identifiers, and time; click through rate, conversion rate, and life time value.

11. The non-transitory computer readable medium of claim 10, wherein the predictions are associated with a measure of accuracy and confidence level.

12. The non-transitory computer readable medium of claim 10, wherein one or more data attributes are assigned a value, and incremental value in using the data.

13. The non-transitory computer readable medium of claim 8, wherein the one or more identifiers separate the aggregated inventory metrics at a level of individual users, media, and advertisement interaction facts resulting in a user database, a media database, and an interaction fact database, of the one or more databases.

14. The non-transitory computer readable medium of claim 13, wherein the user database comprises user identifiers that are linked to identifiers associated with the user in settings of a device or application.

15. A system for providing analysis for advertising transactions comprising one or more computers and one or more storage devices storing instructions that are operable, when executed by the one or more computers, to cause the one or more computers to perform operations comprising:
creating profiles for a plurality of ad requests by:
- aggregating inventory metrics using one or more identifiers according to an ad model, wherein the ad model provides a common language for conducting analysis and exchanging data between different sources;
- the creating comprises reducing a necessary size of one or more databases by computing the inventory metrics at a finest granularity of a number of ad requests per pair of (i,j), wherein i is an inventory of advertising impressions and j is an advertisement presented to a user, and remaining inventory metrics are aggregated based on the pair;

the aggregated remaining inventory metrics are stored on a per request basis in the one or more databases during run time;

identifying a plurality of inventory vectors based on the profiles, wherein the plurality of inventory vectors uniquely identify an ad opportunity at a particular time;

creating a profile database of ad performance comprising performance metrics for each inventory vector, associated data attributes, and ad identifiers;

providing predictions of ad performance metrics as function of time, index of inventory attributes, and the data attributes; and providing a user interface to enable a user to query one or more metrics associated with the one or more identifiers.

16. The system of claim 15, wherein the inventory metrics comprise at least one of number of request, click through rate, conversions rate, prices, bid floors and the time horizon.

17. The system of claim 15, wherein the predictions comprise at least one of bid prices as function of index of inventory; a winning rate as a function of price and index of inventory, inventory identifiers, index of identifiers, and time; click through rate, conversion rate, and life time value.

18. The system of claim 17, wherein the predictions are associated with a measure of accuracy and confidence level.

19. The system of claim 17, wherein one or more data attributes are assigned a value, and incremental value in using the data.

20. The system of claim 15, wherein the one or more identifiers separate the aggregated inventory metrics at a level of individual users, media, and advertisement interaction facts resulting in a user database, a media database, and an interaction fact database, of the one or more databases.

21. The system of claim 20 wherein the user database comprises user identifiers that are linked to identifiers associated with the user in settings of a device or application.

* * * * *